(12) United States Patent  
Itoh

(10) Patent No.: US 9,592,659 B2  
(45) Date of Patent: Mar. 14, 2017

(54) SHEET MATERIAL DETACHING DEVICE AND DETACHING METHOD

(71) Applicant: INTERIOR ITOH LTD., Chiba-shi, Chiba (JP)

(72) Inventor: Katsunori Itoh, Chiba (JP)

(73) Assignee: INTERIOR ITOH LTD., Chiba-Shi, Chiba (JP)

( * ) Notice: Subject to any disclaimer, the term of this patent is extended or adjusted under 35 U.S.C. 154(b) by 0 days.

(21) Appl. No.: 14/760,939

(22) PCT Filed: Aug. 1, 2013

(86) PCT No.: PCT/JP2013/070902  
§ 371 (c)(1),  
(2) Date: Jul. 14, 2015

(87) PCT Pub. No.: WO2014/112147  
PCT Pub. Date: Jul. 24, 2014

(65) Prior Publication Data  
US 2015/0343754 A1 Dec. 3, 2015

(30) Foreign Application Priority Data

Jan. 16, 2013 (JP) .................................. 2013-005030  
Jun. 7, 2013 (JP) .................................. 2013-120411

(51) Int. Cl.  
*B32B 38/10* (2006.01)  
*B32B 38/00* (2006.01)  
(Continued)

(52) U.S. Cl.  
CPC .......... *B32B 38/10* (2013.01); *B32B 38/0004* (2013.01); *B32B 43/006* (2013.01);  
(Continued)

(58) Field of Classification Search  
CPC .................. B32B 38/10; B32B 43/006; Y10T 156/1167; Y10T 156/1168;  
(Continued)

(56) References Cited

U.S. PATENT DOCUMENTS 2,655,976 A * 10/1953 Lovin ................... E04G 23/006  
  156/714  
4,394,052 A * 7/1983 Adams .................. E04G 23/006  
  242/539  
(Continued)

FOREIGN PATENT DOCUMENTS

EP 0294480 A1 12/1988  
JP S60-65867 A 4/1985  
(Continued)

*Primary Examiner* — Mark A Osele  
*Assistant Examiner* — Nickolas Harm  
(74) *Attorney, Agent, or Firm* — Muncy, Geissler, Olds & Lowe, P.C.

(57) ABSTRACT

A device body comprises: a winding roller that is provided so as to contact with a flooring material sheet bonded to a floor and on which is wound the sheet that is stripped from the floor starting from a contact portion with the sheet; a driving means that, by rotationally driving the winding roller, winds the sheet onto the winding roller and strips the same from the floor, and that advances the device body by the winding roller being pushed toward the floor by the reactive force of the removal and rolling on the sheet; and a guiding means that discharges the sheet being stripped from the floor in front of or to the side of the direction of advancement of the device body.

19 Claims, 17 Drawing Sheets

(51) Int. Cl.
  *B32B 43/00* (2006.01)
  *E04G 23/00* (2006.01)
  *E04F 21/20* (2006.01)

(52) U.S. Cl.
  CPC ............ *E04F 21/20* (2013.01); *E04G 23/006*
    (2013.01); *Y10T 156/1168* (2015.01); *Y10T 156/1174* (2015.01); *Y10T 156/1184* (2015.01); *Y10T 156/195* (2015.01); *Y10T 156/1961* (2015.01); *Y10T 156/1967* (2015.01)

(58) Field of Classification Search
  CPC ......... Y10T 156/1174; Y10T 156/1184; Y10T 156/195; Y10T 156/1961; Y10T 156/1967
  USPC ........ 156/714, 717, 759, 761, 762, 920, 940
  See application file for complete search history.

(56) References Cited

U.S. PATENT DOCUMENTS

| | | | | |
|---|---|---|---|---|
| 4,981,548 A * | 1/1991 | Poll | ............ | E02F 5/12 156/499 |
| 5,720,844 A * | 2/1998 | Hanson | ................ | E04G 23/006 156/717 |
| 5,830,313 A * | 11/1998 | Smith | ................... | E04G 23/006 156/717 |
| 5,868,053 A * | 2/1999 | Foltz | ....................... | B26D 1/04 30/169 |
| 6,343,981 B1* | 2/2002 | Buchanan | ............ | E04G 23/006 156/763 |
| 2002/0108720 A1* | 8/2002 | Fitterer | ................ | E04G 23/006 156/429 |
| 2007/0222274 A1* | 9/2007 | Manners | ............... | E04G 23/006 299/36.1 |
| 2007/0246167 A1* | 10/2007 | Goupil | ................. | E04G 23/006 156/763 |
| 2010/0307532 A1* | 12/2010 | Kron | ..................... | E04G 23/006 134/6 |

FOREIGN PATENT DOCUMENTS

| | | |
|---|---|---|
| JP | H04-144865 A | 5/1992 |
| JP | H6-88436 A | 3/1994 |
| JP | 2540007 | 7/1997 |
| JP | H11-91566 A | 4/1999 |
| JP | 2002-188298 A | 7/2002 |
| JP | 2004-225331 A | 8/2004 |
| JP | 2010-222851 A | 10/2010 |
| WO | WO88/04966 A1 | 7/1988 |

* cited by examiner

SHEET MATERIAL DETACHING DEVICE AND DETACHING METHOD

TECHNICAL FIELD

The present invention relates to a sheet material detaching device and a detaching method for stripping a sheet material (a flooring sheet or the like) that is bonded to a base (a floor or the like).

BACKGROUND ART

As a device for stripping a flooring sheet (a carpet sheet, a PVC sheet, or the like) bonded to a floor of an apartment, an office building, or the like, one as shown in FIG. 1 has been known, comprising a device main body (c) provided with wheels (a, b) on the front and rear, in which: a roll core (d) is attached horizontally to be spaced apart from a floor (e); an end portion of a flooring sheet (f) stripped from the floor (e) in front of the device main body (c) is fixed to the roll core (d); and the roll core (d) is rotationally driven in such a direction that the flooring sheet (f) is wound from an upper portion of the roll core (d) (refer to Patent Document 1).

With such a winding stripping device for a flooring sheet or the like, the flooring sheet (f) is stripped from the floor (e) and wound on the roll core (d) by rotating the roll core (d), while a winding force (F) of the roll core (d) is transferred to the floor (e) via the flooring sheet (f) to thereby advance the device main body (c). By stripping the flooring sheet (f) from the floor (e) by winding on the roll core (d), noise and residue are reduced compared to a so-called vibration type detaching device (one inserting a scraping plate between the floor (e) and the flooring sheet (f) and vibrating; refer to Patent Documents 2 and 3).

Patent Document 1: Japanese Unexamined Patent. Application Publication No. S60-65867

Patent Document 2: Japanese Unexamined Patent Application Publication No. 2002-188298

Patent Document 3: Japanese Unexamined Patent Application Publication No. 2004-225331

DISCLOSURE OF THE INVENTION

Problems to be Solved by the Invention

However, the winding stripping device illustrated in FIG. 1 has the following problems.

In the winding stripping device, the device main body (c) is pulled forward from the roll core (d), as the flooring sheet (f) in front of the device main body (c) is stripped from the floor (e) and wound to the roll core (d). Here, since the roll core (d) provided on the device main body (c) is spaced apart from the floor (e), a moment of making the device main body (c) fall forward is generated in accordance with a distance between the roll core (d) and the floor (e). Accordingly, during advancement of the device main body (c), the rear wheel (b) tends to lift and may make it difficult to advance the device main body (c) in a stable manner.

In addition, a pulling force (F) of the flooring sheet (f) being wound on the roll core (d) (the winding force (F) of the roll core (d)) is composed of a horizontal component of force (Fh) and a vertical component of force (Fv), and the horizontal component of force (Fh) pulls the device main body (c) forward while the vertical component of force (Fv) pushes the device main body (c) against the floor (e). As discussed above, a part of the pulling force (winding force) (F) (i.e., horizontal component of force (Fh)) advances the device main body (c) and a remaining force (i.e., vertical component of force (Fv)) pushes the device main body (c) against the floor (e). As a result, both an advancing force and a pushing force against the floor (e) of the device main body (c) may be insufficient.

As described above, in the winding stripping device, when a moment of making the device main body (c) fall forward is generated during winding of the flooring sheet (f), the device main body (c) advances with a smaller force than the winding force (F) and is pushed against the floor (e). As a result, depending on an angle, inclination, and unevenness of the floor (e), as well as an adhesive force of the flooring sheet (f) to the floor (e), it may be difficult to advance the device main body (c) while pushing against the floor (e) in a stable manner. In other words, the winding force (F) is not efficiently used for stable advancement of the device main body (c), and the device still requires improvements.

In addition, since the roll core (d) is spaced apart from the floor (e), the winding force (F) of the roll core (d) stretches the flooring sheet (f) stripped from the floor (e) during winding by the roll core (d), and therefore the winding force (F) of the roll core (d) cannot act intensively on a point of detachment (g) between the flooring sheet (f) and the floor (e). In other words, a part of the winding force (F) of the roll core (d) goes into stretching of the flooring sheet (f) in a space between the point of detachment (g) from the floor (e) and a point of winding (h) to the roll core (d), making it difficult to direct the winding force (F) intensively to the point of detachment (g).

The present invention has been made in view of the above described circumstances, and an objective thereof is to provide a sheet material detaching device and a detaching method that allows advancement while stably and efficiently stripping the sheet material bonded to a base, with low noise and residue.

Means for Solving the Problems

A sheet material detaching device according to the present invention conceived for accomplishing the abovementioned objective is a detaching device for stripping off a sheet material bonded to a base, the device including:

a device main body;

a winding roller that is provided on the device main body so as to be in contact with the sheet material and on which is wound the sheet material that is stripped from the base from a point of contact with the sheet material;

a driving means that, by rotationally driving the winding roller, strips the sheet material from the base, and advances the device main body by pushing the winding roller against the base by a stripping reactive force and rolling the winding roller on the sheet material; and a guiding means that guides the sheet material, which is stripped from the base by winding on the winding roller rotationally driven by the driving means, to be discharged to a front side or a lateral side of a traveling direction of the device main body.

In the sheet material detaching device according to the present invention, the guiding means can include one or plurality of retaining rollers for pushing the sheet material, which is stripped from the base and wound on the winding roller, against the winding roller.

In the sheet material detaching device according to the present invention, at least one of the retaining rollers can be arranged on an upper and front side of a rear end of the winding roller in the traveling direction of the device main body.

In the sheet material detaching device according to the present invention, there is a plurality of the retaining rollers;
an endless belt stretched around the retaining rollers is provided; and
the sheet material can be sandwiched between the endless belt and the winding roller, and pushed against the winding roller via the endless belt.

In the sheet material detaching device according to the present invention, a protection inside the endless belt is provided for preventing residue, which is generated during stripping of the sheet material from the base, from being caught between the endless belt and the retaining roller,
the protection can include: a cover that covers the retaining roller along a longitudinal direction of the retaining roller;
a contact portion that is provided on the cover and in contact with an inner peripheral surface of the endless belt; and
a supporting portion that is provided on the cover and supported by a shaft of the retaining roller.

In the sheet material detaching device according to the present invention, the guiding means can include a guiding plate arranged in the vicinity of the winding roller along a peripheral direction thereof.

In the sheet material detaching device according to the present invention, the guiding means can include a discharge cover for guiding the sheet material, which is discharged from the winding roller, to an upper side of the device main body.

In the sheet material detaching device according to the present invention, a protective cover can be provided in a front portion of the device main body, the protective cover preventing the sheet material, which is discharged to the upper side from the discharge cover, from entering inside the device main body.

In the sheet material detaching device according to the present invention, a plow member can be provided in a front portion of the device main body, the plow member pushing the sheet material, which is discharged to the front side of the traveling direction of the device main body, in accordance with advancement of the device main body and preventing the sheet material from being caught in a lower side of the device main body.

In the sheet material detaching device according to the present invention, a cutter can be provided in the device main body, the cutter being positioned on each side of the winding roller and cutting the sheet material stripped from the base, wherein the cutter is attached to the device main body so as to be positioned more on an upper side than a lower end of the winding roller.

In the sheet material detaching device according to the present invention, the cutter comprises a blade portion in a lower portion thereof, the blade portion being attached to the device main body so as to penetrate the sheet material wound from the base by the winding roller.

In the sheet material detaching device according to the present invention, provided are a scraping plate that extends from a rear side of the traveling direction of the device main body to a lower side of the winding roller, the scraping plate being inserted into a point of detachment between the sheet material, which is stripped from the base, and the base; and
a preceding guide that guides the sheet material, which is stripped from the base and rides on the scraping plate, toward the winding roller, in which the scraping plate is composed of a flexible material and attached to the device main body such that, when the sheet material bonded to the base is in contact with the winding roller, a leading end of the scraping plate is pushed against the base and such that an angle with respect to the base is adjustable; and
the preceding guide is composed of a thin plate of a flexible material, a lower end of the preceding guide is pushed against the scraping plate, and, when the angle of the scraping plate with respect to the base is changed, a degree of curvature of the preceding guide changes flexibly in accordance with the change of the angle of the scraping plate, thereby guiding smoothly the sheet material riding on the scraping plate.

In addition, a sheet material detaching method according to the present invention is a detaching method of a sheet material bonded to a base, including:
bringing a winding roller into contact with the sheet material bonded to the base;
winding an end portion of the sheet material stripped from the base on the winding roller from a point of contact with the winding roller;
rotating the winding roller and winding up the sheet material by the winding roller to strip the sheet material from the base, while pushing the winding roller against the base by a stripping reactive force and advancing by rolling the winding roller on the sheet material not stripped from the base; and
discharging the sheet material which is wound on the winding roller and stripped from the base to a front side or a lateral side of a traveling direction of the winding roller.

In the sheet material detaching method according to the present invention,
the sheet material which is wound up by the winding roller and stripped from the base can be cut by pushing against a cutter arranged on each side of the winding roller to be spaced apart from the base, immediately after being stripped from the base.

In the sheet material detaching method according to the present invention,
in order to retain the sheet material which is stripped from the base and wound on the winding roller by pushing against the winding roller and preventing slipping, by providing a plurality of retaining rollers arranged in the vicinity of the winding roller and an endless belt stretched around the retaining rollers,
the sheet material can be sandwiched between the endless belt and the winding roller, and pushed against the winding roller via the endless belt.

Effects of the Invention

According to the present invention, as the winding roller is rotated in contact with the sheet material bonded to the base, a reactive force generated upon stripping the sheet material from the base by winding by the winding roller (stripping reactive force) pushes the winding roller against the sheet material. Since the stripping reactive force correlates with (positively correlates, is proportional to) an adhesive force of the sheet material with respect to the base, the greater the adhesive force, the greater the force pushing the winding roller against the sheet material.

As a result, the winding roller is pushed against the sheet material with appropriate force in accordance with the adhesive force of the sheet material, to thereby suppress slipping of the winding roller on the sheet material. Even a sheet material having great adhesive force with respect to a base can thus be stripped infallibly, and the device main body can be advanced infallibly with great force. In addition, as the winding roller rolls in a state of being pushed against the sheet material bonded to the base with appropriate force in accordance with the adhesive force, the device main body can be advanced in a stable manner even if the base is sloped or inclined.

The sheet material is stripped by winding on the winding roller that is pushed against the sheet material bonded to the base. Unlike in the prior art (refer to FIG. 1) that strips the flooring sheet by winding on the roll core spaced apart from the floor, the sheet material in the air is not stretched and the stripping force of the winding roller can be directed to the point of detachment of the sheet material from the base, to thereby strip the sheet material from the base effectively.

Since the sheet material is stripped from the base by winding by the winding roller rolling in contact with the sheet material bonded to the base, noise and residue are suppressed compared to a so-called vibration type device. In addition, the device main body advances and the flooring sheet is detached without a worker applying force, to thereby reduce workload.

The sheet material which is wound on the winding roller and stripped from the base is discharged to a front side or a lateral side of a traveling direction of the device main body. This can prevent the device main body and a worker who is operating the device main body from stepping on the sheet material stripped from the base as the device main body advances, to thereby improve work efficiency. In addition, by configuring to discharge the sheet material to a front side of the traveling direction of the device main body, the discharged sheet material can be pushed out by the device main body as the device main body advances. The sheet material stripped from the base can thus be transferred in a mass in front of the device main body, to thereby facilitate disposal.

PREFERRED MODE FOR CARRYING OUT THE INVENTION

Figure 1:
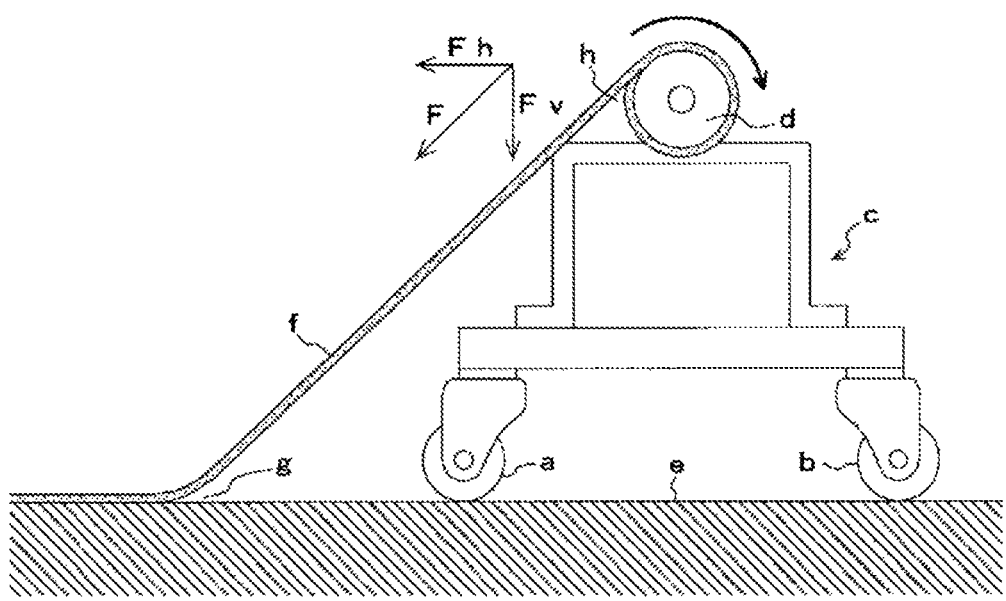
FIG. 1 is a side view of a detaching device of a sheet material, illustrating a prior art.

A preferred embodiment of the present invention is described in detail hereinafter, with reference to the attached drawings. Dimensions, materials, and other specific numerical values are mere examples for facilitating understanding of the invention, and should not be construed to limit the present invention unless otherwise specified. It should be noted that, in the present Specification and the Drawings, elements having substantially identical functions and configurations are referred to by the same symbol and repetitive description is omitted. In addition, elements which are not directly relevant to the present invention are not illustrated. (Sheet Material Detaching Device 1)

FIGS. 2 to 5 illustrate a sheet material detaching device 1 according to an embodiment of the present invention. The sheet material detaching device 1 according to the present embodiment is for stripping a sheet material (e.g. flooring sheet 3) bonded to a base (e.g. floor 2), and includes a device main body 4, a winding roller 5 provided in the device main body 4 to be in contact with the flooring sheet 3, and a driving means 6 that rotationally drives the winding roller 5. (Device Main Body 4)

As illustrated in FIGS. 2 to 5, the device main body 4 is composed of a pair of frame plates 7 spaced apart from each other in a vehicle width direction (axial direction of the winding roller 5), pipes 8 provided on a rear side of the frame plates 7, etc.

Figure 2:
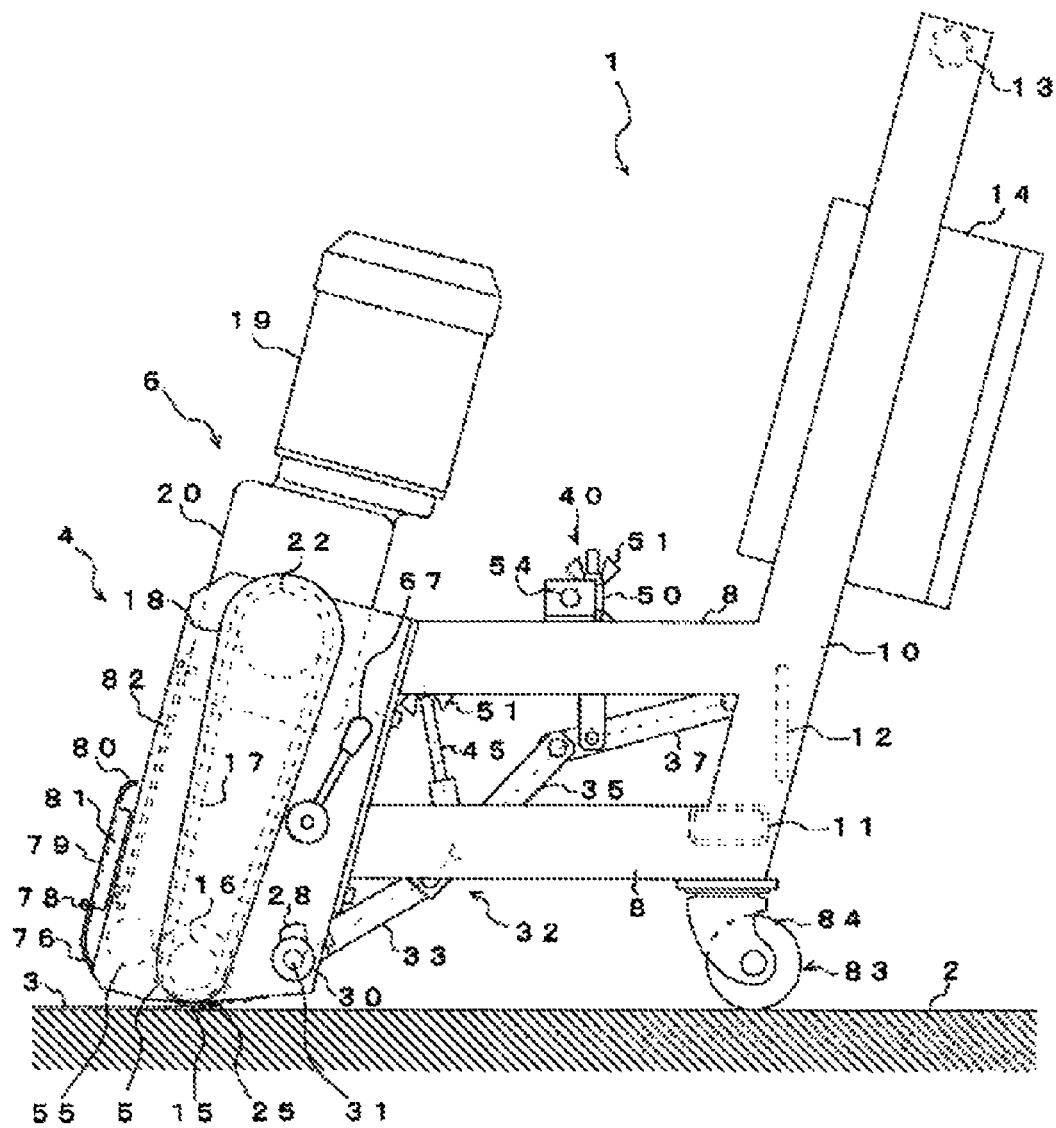
FIG. 2 is a side view of a detaching device of a sheet material according to an embodiment of the present invention.
Figure 5:
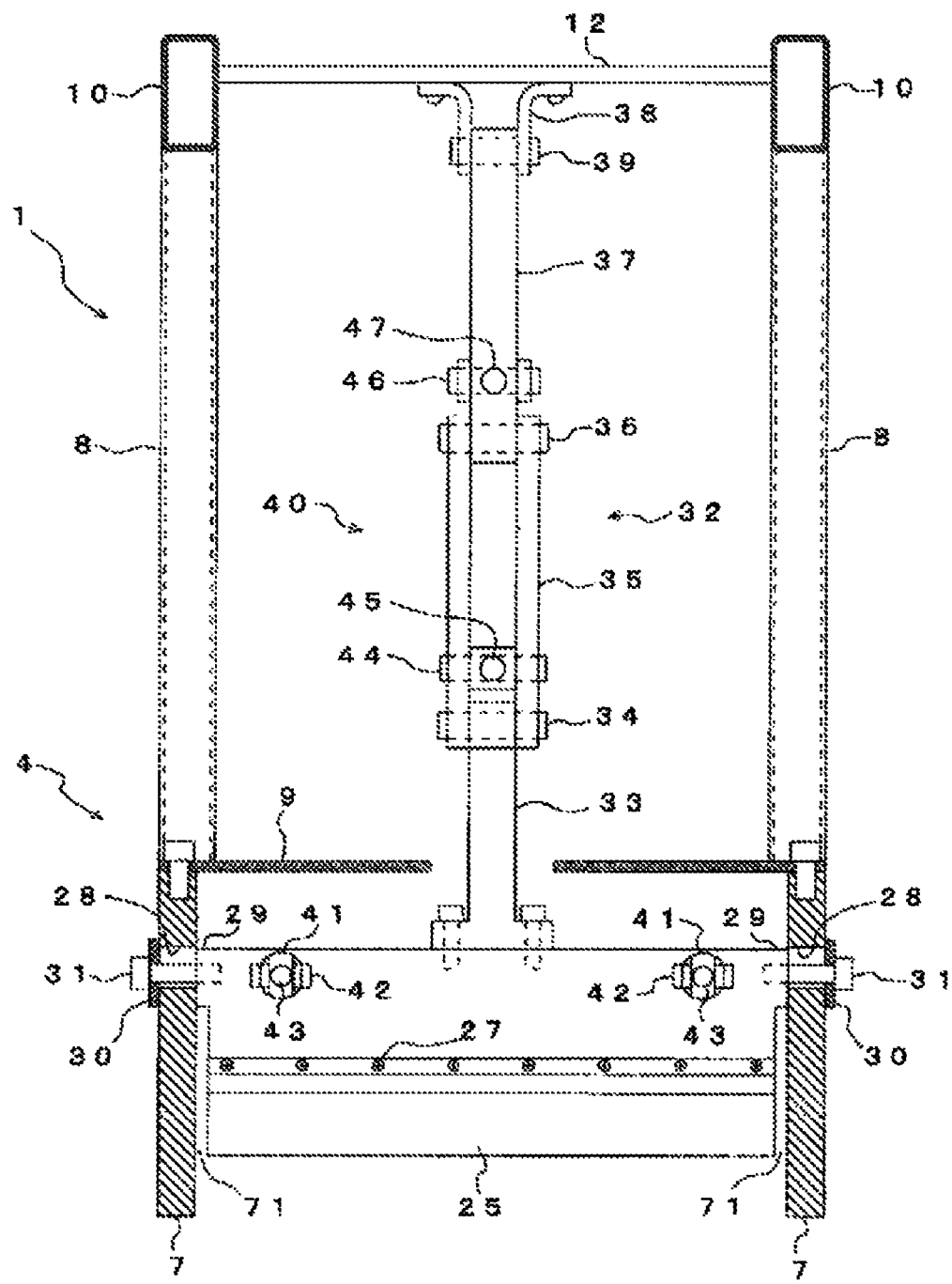
FIG. 5 is a planar cross-sectional view of the detaching device illustrated in FIG. 2.

The frame plates 7 on left and right sides in the vehicle width direction are connected by a connecting member such as a connecting plate 9 illustrated in FIG. 5. As illustrated in FIG. 2, upper and lower lateral pipes 8 are connected to a rear side of the left and right frame plates 7, and vertical pipes 10 are provided to extend obliquely upward from a rear side of the lateral pipes 8. Lower parts of the left and right vertical pipes 10 are connected to each other by a connecting pipe 11 and a connecting plate 12, and upper parts of the left and right vertical pipes 10 are connected to each other by a handle pipe 13. A worker grips the handle pipe 13 when stripping the flooring sheet 3 from the floor 2.

As materials for the frame plates 7, the pipes 9, etc., metals such as iron, stainless steel, and aluminum are employed in the present embodiment. However, provided that there is no strength issue, the frame plates 7, the pipes 9, etc. can be reduced in weight by employing resin such as plastic. Between the left and right vertical pipes, a control box 14 that controls the driving means 6 that rotationally drives the winding roller 5 is provided.

(Winding Roller 5)

Figure 3:
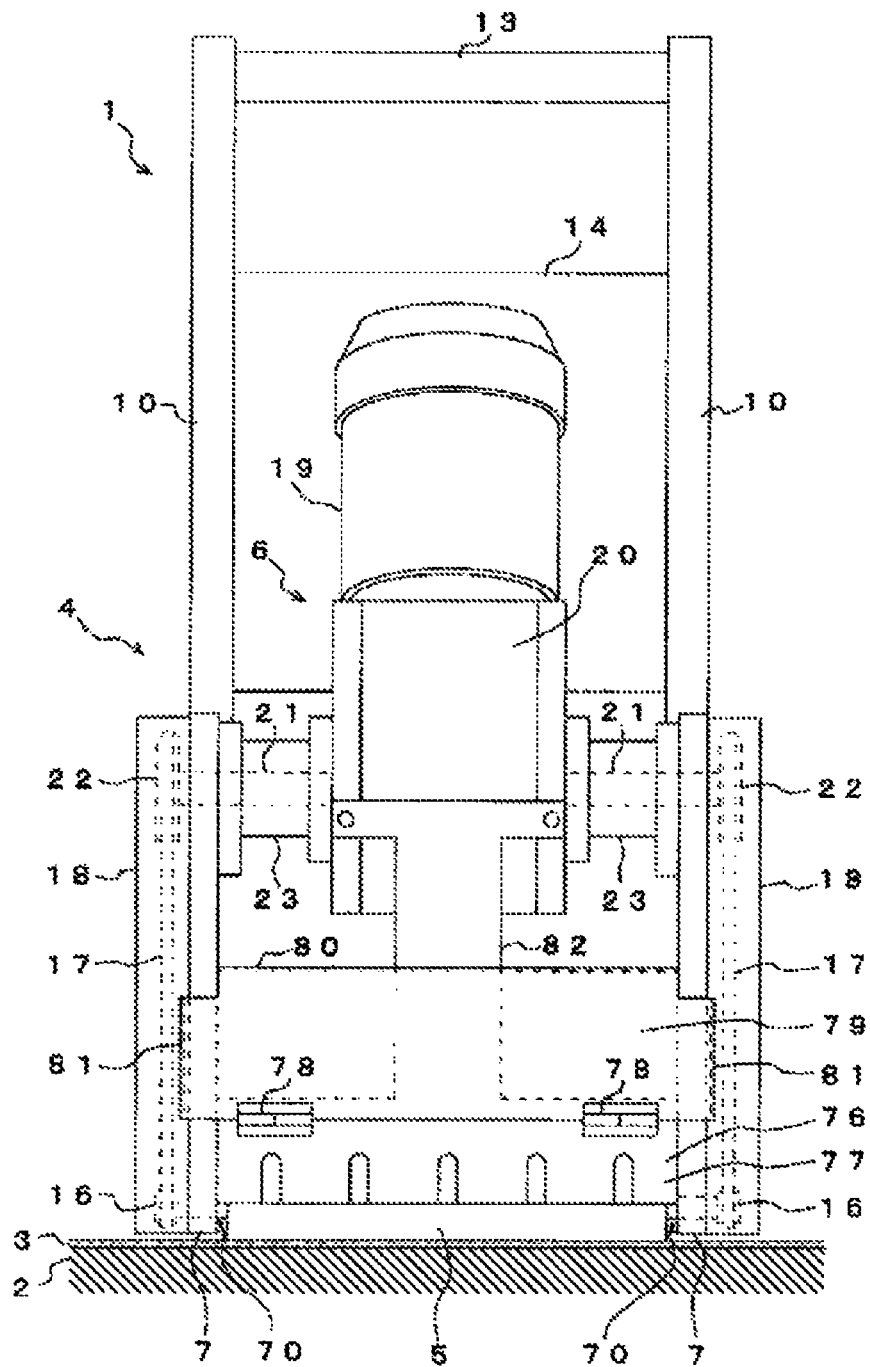
FIG. 3 is a front view of the detaching device illustrated in FIG. 2.
Figure 4:
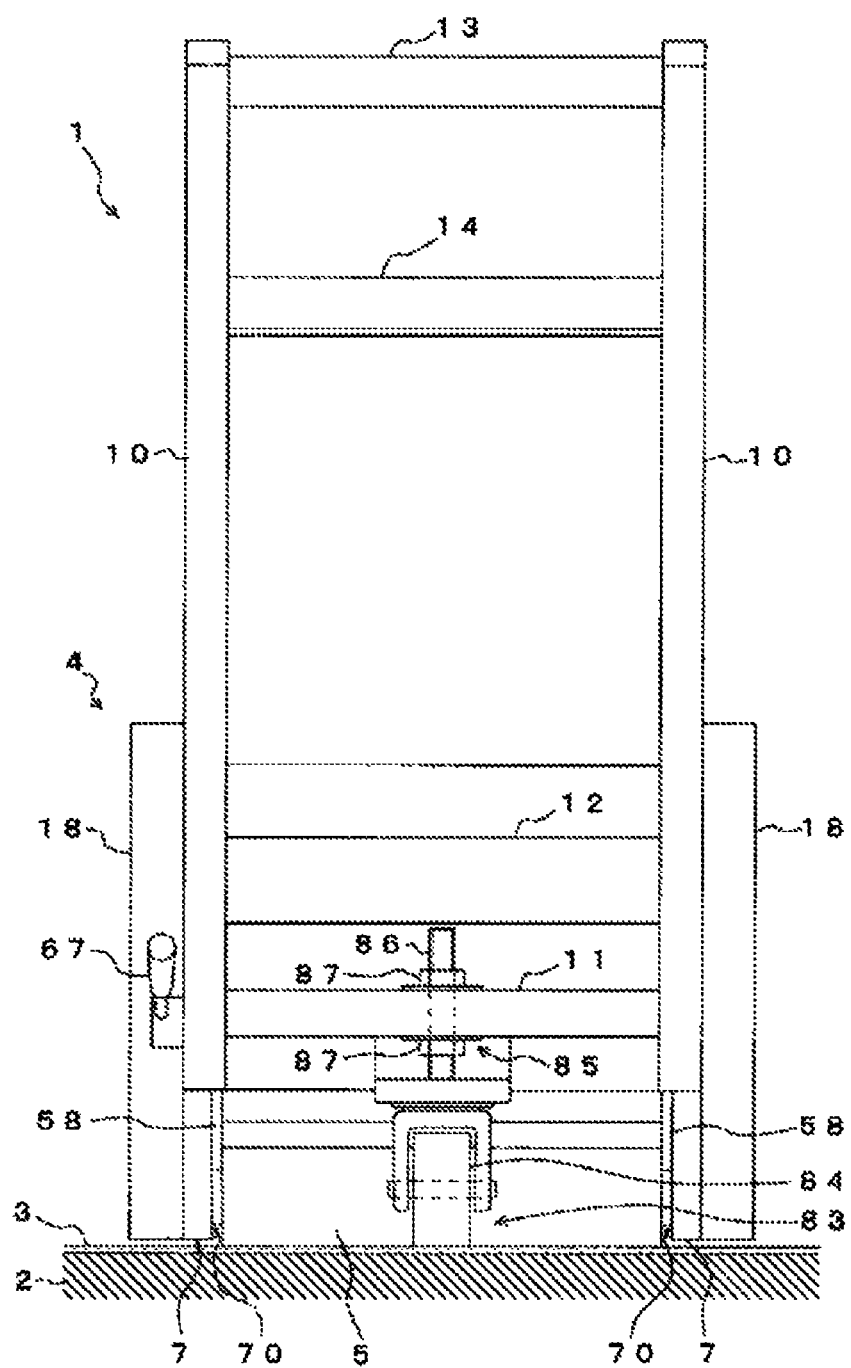
FIG. 4 is a rear view of the detaching device illustrated in FIG. 2.

As illustrated in FIGS. 2 to 4, the winding roller 5 is provided between the frame plates 7. The winding roller 5 is attached to a lower part of the frame plates 7 such that, when the device main body 4 is placed on the floor 2 in order to strip the flooring sheet 3, a lower end of the winding roller 5 is in contact with the flooring sheet 3.

Figure 6:
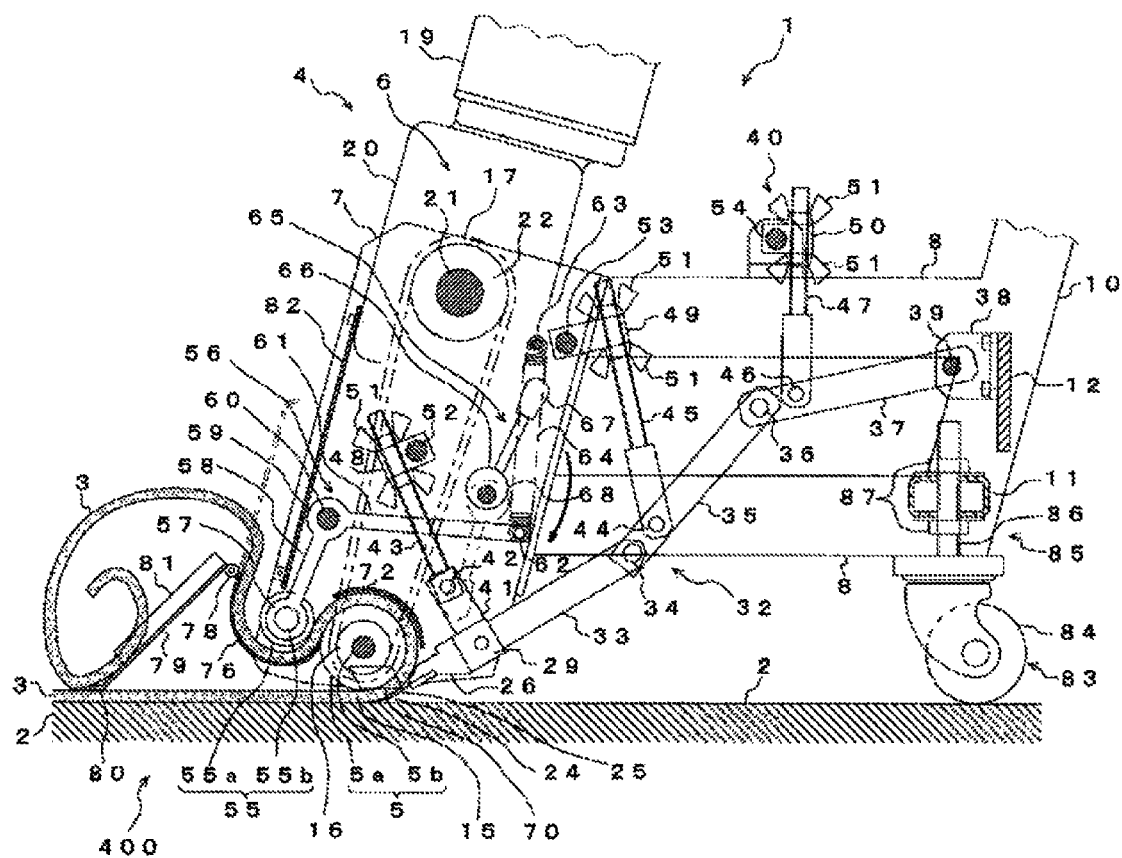
FIG. 6 is a transparent side view illustrating an operating state of the detaching device illustrated in FIG. 2.
Figure 7:
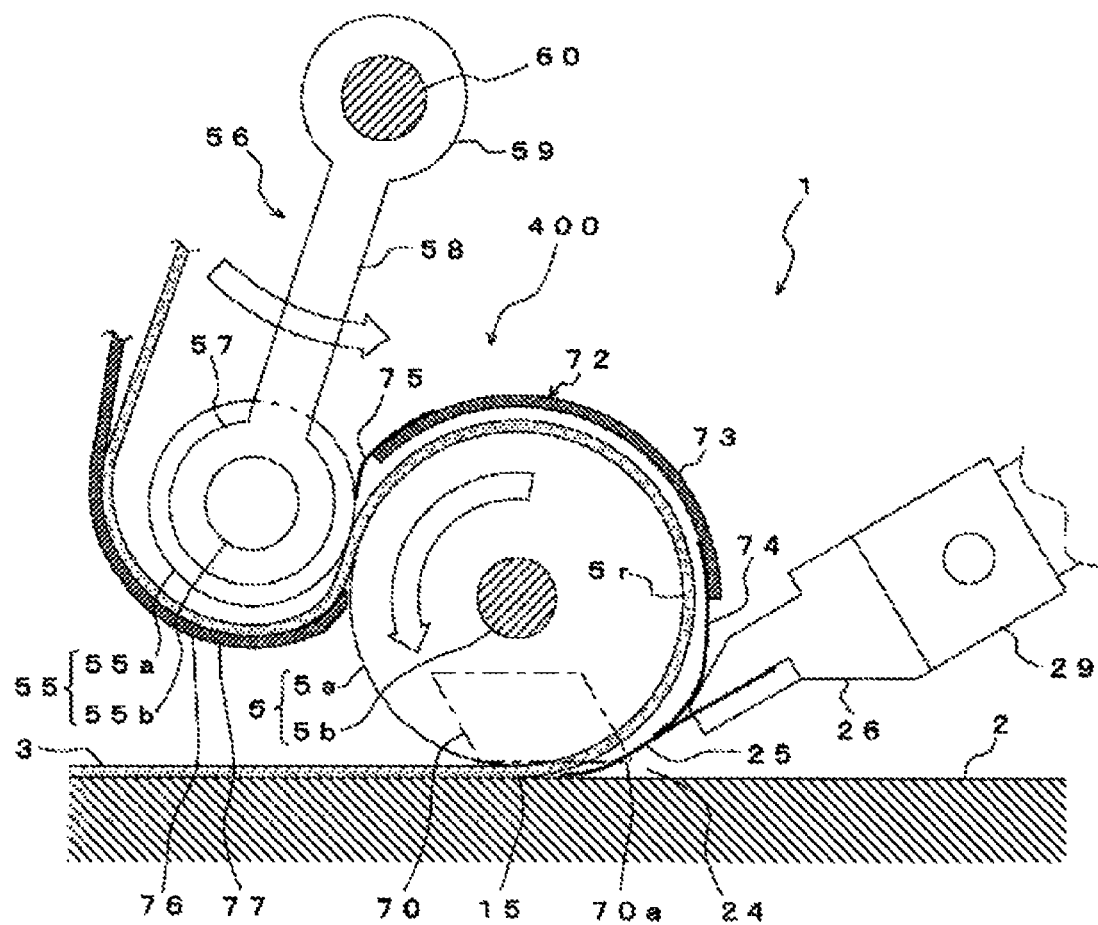
FIG. 7 is an enlarged view of a major part of the detaching device illustrated in FIG. 6.

As illustrated in FIGS. 6 and 7, the winding roller 5 includes a cylindrical roller main body 5a on which the flooring sheet 3, which is stripped from the floor 2, is wound from a point of contact 15 with the flooring sheet 3, and a shaft 5b that is provided to protrude from the center of left and right end face of the roller main body 5a. As a material for the roller main body 5a, metal such as iron, stainless steel, or aluminum is employed in the present embodiment; however, provided that there is no strength issue, resin such as plastic can be employed. Unevenness, grooves, or a plurality of spine-like portions (needle-like portions) can be formed on a surface of the roller main body 5a, for example by knurling, and can serve as an anti-slip portion for the flooring sheet 3 to be wound. Alternatively, an anti-slip layer composed of rubber, resin, or the like can be provided on the roller main body 5a so as to cover the surface thereof.

Figure 8:
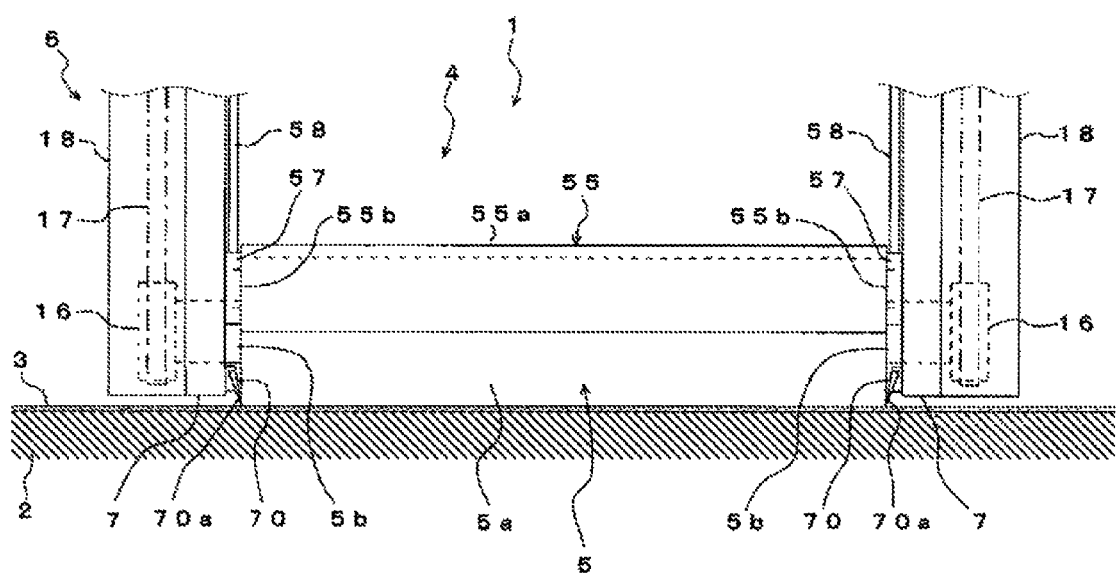
FIG. 8 is an enlarged front view of a major part of the detaching device illustrated in FIG. 7.

As illustrated in FIG. 8, the shaft 5b of the winding roller 5 is inserted through a bore provided to be through the left and right frame plates 7 and rotatably supported via a bearing or the like. A driven sprocket 16 is attached to a leading end of the shaft 5b. An endless chain 17 is wound on the driven sprocket 16. The driven sprocket 16 and the endless chain 17 compose a part of the driving means 6, and are covered by a cover 18 attached to an outer side face of the frame plate 7. The cover 18 prevents foreign matters from being caught in the endless chain 17 and the driven sprocket 16.

(Driving Means 6)

The winding roller 5 is rotationally driven by the driving means 6 illustrated in FIGS. 2 and 3. By rotationally driving the winding roller 5, the driving means 6 winds and strips the flooring sheet 3 wound on the winding roller 5 from the floor 2 as illustrated in FIGS. 6 and 7, while pushing the winding roller 5 against the floor 2 and rolling on the sheet material 3 by the stripping reactive force to thereby advance the device main body 4.

As illustrated in FIGS. 2 and 3, the driving means 6 comprises: a motor 19 disposed on an upper side between the left and right frame plates 7; a gear box 20 in which a gear mechanism for slowing down rotation of the motor 19 is enclosed; a horizontal shaft. 21 as an output shaft of the gear box 20 that projects horizontally from left and right and is inserted through a bore provided to be through the frame plate 7; a driving sprocket 22 that is attached to the horizontal shaft 21; the driven sprocket 16 attached to the shaft 5b of the winding roller 5; and the endless chain 17 that is wound around the driving sprocket 22 and the driven sprocket 16.

The driving sprocket 22, the driven sprocket 16 and the endless chain 17 are covered by the cover 18 attached to an outer side face of the frame plate 7. In addition, the horizontal shaft 21 is covered by a cover pipe 23. The cover pipe 23 is provided so as to connect the gear box 20 and the frame plate 7, and also exert a function of supporting the gear box 20 on the frame plate 7. The motor 19 is attached to the gear box 20. It should be noted that the winding roller 5 can also be rotationally driven by the motor 19 by means of a gear train, without employing the endless chain 17 or the like.

(Scraping Plate 25)

As illustrated in FIGS. 2, 6 and 7, the sheet material detaching device 1 is provided with a scraping plate 25 that is inserted into a point of detachment 24 between the flooring sheet 3 stripped from the floor 2 and the floor 2. As illustrated in FIG. 7, the scraping plate 25 is composed of a pliable material (flexible material) such as spring steel, and is attached to the device main body 4 such that a leading end thereof is pushed against the floor 2 when the device main body 4 is placed on the floor 2.

As illustrated in FIGS. 5 to 7, the scraping plate 25 is attached by a fastening member 27 such as a screw or a bolt to a block-like retaining member 26 disposed between the left and right frame plates 7. As illustrated in FIG. 5, a convex portion 29 is provided on both end portions in a width direction of the retaining member 26, so as to correspond to a position of an adjustment hole 28 provided to be through the frame plate 7 and to be in contact with an inner side face of the frame plate 7. A screw hole is formed in the convex portion 29. A fastening member such as a bolt 31, which is inserted through the adjustment hole 28 from the outer side face of the frame plate 7 via a washer 30, is screwed onto the screw hole (refer to FIG. 2).

As illustrated in FIG. 5, a diameter of the bolt 31 is smaller than the adjustment hole 28, allowing change of position of the bolt 31 within the adjustment hole 28. By screwing the bolt 31 into a screw hole of the convex portion 29, the washer 30 is pushed against the outer side face of the frame plate 7 and the convex portion 29 is pushed against the inner side face of the frame plate 7, to thereby fix an angle and a position of the retaining member 26. This can fix an angle and a position of the scraping plate 25, which is attached to the retaining member 26, with respect to the floor 2.

(Angle Adjusting Mechanism 32)

As illustrated in FIGS. 2, 5 and 6, the angle of the scraping plate 25 with respect to the floor 2 can be adjusted by the angle adjustment mechanism 32. The angle adjustment mechanism 32 is provided with: a first link 33 that is attached by a bolt or the like to a rear portion of the retaining member 26 to which the scraping plate 25 is attached; a second link 35 that is connected by a pin 34 to the first link 33; and a third link 37 that is connected by a pin 36 to the second link 35. An end portion of the third link 37 is supported by a pin 39 on a bracket 38 attached to the connecting plate 12. By rotating the links 33, 35, 37 at the pins 34, 36, 39 appropriately, the angle of the scraping plate 25 with respect to the floor 2 can be changed and the position of a leading end of the scraping plate 25 with respect to the floor 2 (in an anteroposterior direction and a vertical direction) can be changed within a movable range of the bolt 31 in the adjustment hole 28. It should be noted that the angle adjustment mechanism 32 can be configured to change only the angle of the scraping plate 25.

The angles of the links 33, 35, 37 are configured to be fixed by the fixing means 40. The fixing means 40 is provided with a first screw rod 43 that is rotatably connected by a pin 42 to a bracket 41 which is provided in the retaining member 26 to which the scraping plate 25 is attached; a second screw rod 45 that is rotatably connected by a pin 44 to the second link 35; and a third screw rod 47 that is rotatably connected by a pin 46 to the third link 37. Collars 48, 49, 50 are inserted to the screw rods 43, 45, 47 respectively, and a nut (butterfly nut) 51 is screwed thereonto across the collars 48, 49, 50. The collars 48, 49, 50 are rotatably supported by the shafts 52, 53, 54 which are attached to the device main body 4. The shafts 52, 53 are disposed to join the left and right frame plates 7, and the shaft 54 is disposed to join the left and right lateral pipes 8. With the above described fixing means 40, the angles (attitudes; of the links 33, 35, 37) can be fixed by fixing the positions of the collars 48, 49, 50 by tightening the nuts 51. It should be noted that shafts that are shaded in FIG. 6 are fixed to the device main body 4, and shafts that are white and outlined are free from the device main body 4.

(Guiding Means 400)

As illustrated in FIGS. 6 and 7, the sheet material detaching device 1 is provided with a guiding means 400. The guiding means 400 is a means that guides the flooring sheet 3, which is stripped from the floor 2 by winding on the winding roller 5 rotationally driven by the driving means 6, to be discharged to a front side or a lateral side of a traveling direction of the device main body 4. The guiding means 400 comprises a retaining roller 55 for pushing the flooring sheet 3, which is stripped from the floor 2 and wound on the winding roller 5, against the winding roller 5. The retaining roller 55 is arranged on an upper and front side of a rear end 5r of the winding roller 5 in the traveling direction of the device main body 4. The position of the retaining roller 55 is not limited to that in FIG. 7 and can also be that in FIG. 12. By positioning the retaining roller 55 at the position illustrated in FIG. 7, the flooring sheet 3 stripped from the floor 2 can be discharged to the front side of the winding roller 5. By positioning the retaining roller 55 at the position illustrated in FIG. 12, the flooring sheet 3 stripped from the floor 2 can be discharged to the upper and front side of the winding roller 5. The number of the retaining roller(s) is not limited to one and can be plural. In a case in which there is a plurality of the retaining rollers, at least one of these is arranged on an upper and front side of a rear end 5r of the winding roller 5 in the traveling direction.

(Retaining Roller 55)

Figure 12:
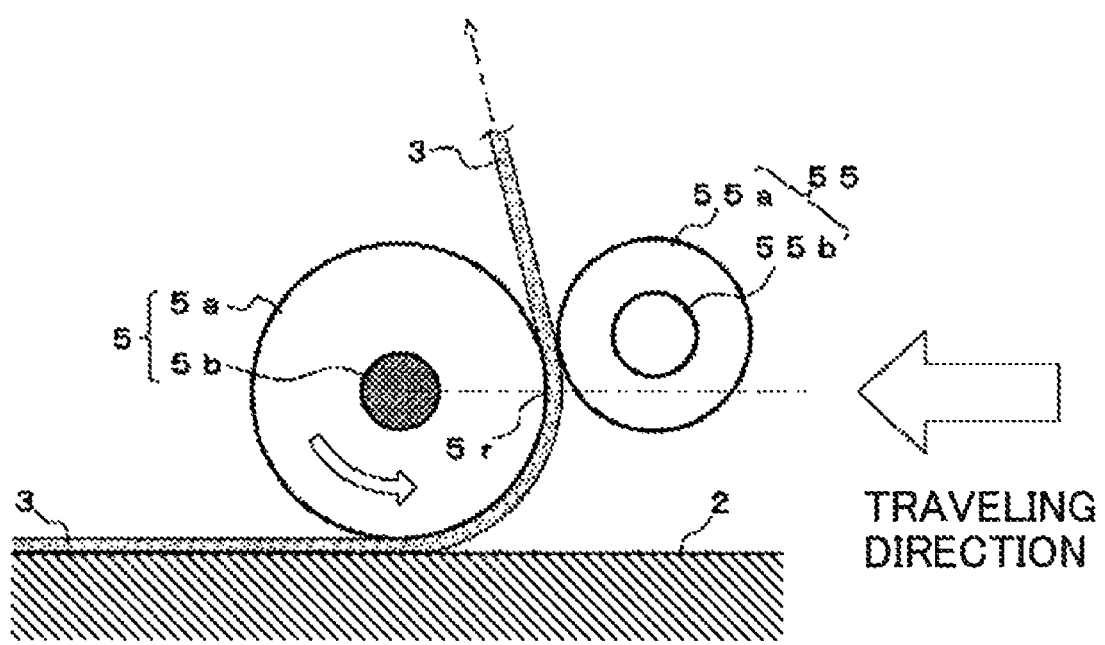
FIG. 12 is an explanatory diagram of the detaching device illustrated in FIG. 7, in which a position of the retaining roller is changed.

The retaining roller 55 illustrated in FIGS. 6, 7, 12 has a function of retaining the sheet material 3, which is stripped from the floor 2 and wound on the winding roller 5, by pushing against the winding roller 5 to suppress slipping, in addition to a function as the guiding means 400 as described above. The retaining roller 55 includes: a cylindrical roller main body 55a that is the same in length (width) as the winding roller 5, and a shaft 55b that is provided to protrude from the center of left and right end face of the roller main body 55a, and the sheet material 3 is sandwiched between the retaining roller 55 and the winding roller 5. In the present embodiment illustrated in FIGS. 6 and 7, the retaining roller 55 is arranged more to a front side than the center of the winding roller 5 in order to increase the length of the flooring sheet 3 that can be wound on the winding roller 5 (a distance, along an outer peripheral surface of the winding roller 5, between the point of detachment 24 from the floor 2 and the retaining roller 55).

As a material for the roller main body 55a, metal such as iron, stainless steel, or aluminum, as well as resin such as plastic can be employed. Unevenness, grooves, or a plurality of spine-like portions (needle-like portions) can be formed on a surface of the roller main body 55a, for example by knurling, and can serve as an anti-slip portion for the flooring sheet 3 to be sandwiched with the winding roller 5. Alternatively, an anti-slip layer composed of rubber, resin, or the like can be provided on the roller main body 55a so as to cover the surface thereof.

(Pushing Means 56)

As illustrated in FIGS. 6 and 7, the retaining roller 55 is pushed against the winding roller 5 by the pushing means 56. The pushing means 56 includes: a first thin collar 57 into which the shaft 55b of the retaining roller 55 is inserted; a first arm 58 that extends obliquely upward from the first thin collar 57; a second thin collar 59 that is provided at an upper end of the first arm 58; a supporting pin 60 that is inserted into the second thin collar 59 and fixed onto the frame plate 7; a second arm 61 that extends backward from the second thin collar 59; a pin 62 that is provided at a rear end of the second arm 61; and an extension spring (coil spring) 64 that is locked by the pin 62 and a pin 63 which is fixed to the frame plate 7.

With the pushing means 56, by a tensile strength of the extension spring 64, the second arm 61 is rotationally moved in a counterclockwise direction about the supporting pin 60; the first arm 58 is rotationally moved in a counterclockwise direction about the supporting pin 60; and the retaining roller 55 is pushed against the winding roller 5. As a result, the flooring sheet 3 that is wound on the winding roller 5 is clamped between the winding roller 5 and the retaining roller 55. The first thin collar 57 composing the pushing means 56 is disposed in a space between a side face of the roller main body 55a of the retaining roller 55 and an inner side face of the frame plate 7, as illustrated in FIG. 8.

(Stopper Mechanism 65)

As illustrated in FIG. 6, a stopper mechanism 65 for retaining the retaining roller 55 to be spaced apart from the winding roller 5 is provided on the frame plate 7. The stopper mechanism 65 is provided with: an eccentric cam 66 that is disposed on the inner side face of the frame plate 7 on an upper side of the second arm 61; and an operation lever 67 that is fixed to the eccentric cam 66. The eccentric cam 66 includes a disk and a supporting shaft 68 that is provided eccentrically from the center of the disk. The supporting shaft 68 is rotatably supported on a hole provided on the frame plate 7.

By moving the operation lever 67 to an upper rotated position as shown with solid lines in FIG. 6, the eccentric cam 66 is spaced apart from the second arm 61. As a result, the second arm 61 is allowed to rotate in the counterclockwise direction by the tensile force of the extension spring 64, to thereby push the retaining roller 55 against the winding roller 5 (clamp state). By rotating the operation lever 67 in the clockwise direction to a lower rotated position as shown with virtual lines in FIG. 6, the eccentric cam 66 is in contact with the second arm 61 to restrict the rotation of the second arm in the counterclockwise direction. The retaining roller 55 is thus maintained to be spaced apart from the winding roller 5 (unclamp state).

(Cutter 70)

As illustrated in FIGS. 6 to 8, a cutter 70 is attached to the device main body 4. The cutter 70 is positioned on each lateral side of the winding roller 5 and cuts the flooring sheet 3 stripped from the floor 2 to the length of the winding roller 5. The cutter 70 is attached to the inner side face of the frame plate 7 of the device main body 4 by means of a fastening member such as a bolt, and arranged in a space 71 between both ends in the width direction of the scraping plate 25 illustrated in FIG. 5 and the inner side face of the frame plate 7.

As illustrated in FIG. 7, the cutter 70 is attached to a position as close as possible to the floor 2, so as to cut the flooring sheet 3 which is wound up by the winding roller 5 and stripped from the floor 2 immediately after being stripped upward from the floor 2. However, a lower end of the cutter 70 is positioned more on an upper side than a lower end of the winding roller 5. As a result, when the device main body 4 is placed on the floor 2 (flooring sheet 3) and the winding roller 5 is in contact with the floor 2, the cutter 70 is spaced upward apart from the floor 2. This can prevent damage of a blade portion 70a of the cutter 70 by the floor 2, as well as damage of the floor 2 by the cutter 70.

As illustrated in FIG. 8, the blade portion 70a of the cutter 70 is formed on a lower part of the cutter 70. In addition, as illustrated in FIG. 7, the cutter 70 is attached to the frame plate 7 such that the blade portion 70a thereof penetrates the flooring sheet 3 wound by the winding roller 5.

(Guiding Plate 72)

As illustrated in FIGS. 6 and 7, a guiding plate 72 is provided in the device main body 4, on an upper side of the winding roller 5 along a peripheral direction of the winding roller 5. The guiding plate 72 is a plate for guiding the flooring sheet. 3, which is stripped from the floor 2 and wound on the winding roller 5, toward a point of contact with the retaining roller 55 as the winding roller 3 rotates. The guiding plate 72 is composed of a curved plate 73 that is similar in width to, and concentric with, the winding roller 5, and has an arcuate cross-section. Both ends of the guiding plate 72 are fixed to the frame plate 7 by means of a fastening member such as a bolt. An unevenness portion, grooves, or the like can be provided on the curved plate 73 in order to reduce a contact area with the flooring sheet 3 and reduce frictional resistance. The guiding plate 72 composes a part of the guiding means 400 that guides the flooring sheet 3, which is stripped from the floor 2 by winding on the winding roller 5 to be discharged to a front side or a lateral side of a traveling direction of the device main body 4.

(Preceding Guide 74)

As illustrated in FIG. 7, a preceding guide 74 is provided on a first end (on a side of entry of the flooring sheet 3) of the guiding plate 72. The preceding guide 74 is a member for guiding the flooring sheet 3, which is stripped from the floor 2 and riding on the scraping plate 25, from the scraping plate 25 to the guiding plate 72. The preceding guide 74 is composed of a thin plate (for example, appropriately 0.3 mm in thickness) of a flexible material such as spring steel, having a similar width to the winding roller 5. An upper end of the preceding guide 74 is fixed to an inner peripheral surface of the guiding plate 72, and a lower end is pushed against the scraping plate 25, thereby bending the preceding guide 74. As a result, when the angle of the scraping plate 25 with respect to the floor 2 is changed, a degree of curvature of the preceding guide 74 is flexibly changed accordingly. The flooring sheet 3 which is stripped from the floor 2 and riding on the scraping plate 25 can thus be guided by the preceding guide 74 smoothly and appropriately to the guiding plate 72. The preceding guide 74 also functions as a biasing member that pushes and bends the scraping plate 25, which is composed of a flexible material, against the floor 2. It should be noted that the preceding guide 74 can also be pushed against the retaining member 26, in addition to the scraping plate 25.

As illustrated in FIG. 7, a following guide 75, which guides the flooring sheet 3 exiting the guide plate 72 to a point of contact between the winding roller 5 and the retaining roller 55, is provided on a second end (on a side of exit of the flooring sheet 3) of the guiding plate 72. The following guide 75 is composed of a thin plate of a flexible material such as spring steel, having a similar width to the winding roller 5. An upper end of the following guide 75 is fixed to an outer peripheral surface of the guiding plate 72, and a lower end thereof is pushed against the surface of the retaining roller 55, thereby bending the following guide 75.

(Discharge Cover 76)

As illustrated in FIGS. 6 and 7, a discharge cover 76 is attached to the device main body 4. The discharge cover 76 is a member that is positioned on a lower side of the retaining roller 55 and discharges the flooring sheet 3, which is discharged from between the winding roller 5 and the retaining roller 55, to an upper side of the device main body 4. The discharge cover 76 is composed of a curved plate 77 that is formed to have an arcuate cross-section on a lower side of the retaining roller 55, and fixed to the frame plate 7 by means of a fastening member such as a bolt at each end thereof. An unevenness portion, grooves, or the like can be provided on the curved plate 77 in order to reduce a contact area with the flooring sheet 3 and reduce frictional resistance. The discharge cover 76 composes a part of the guiding means 400 that guides the flooring sheet 3, which is stripped from the floor 2 by winding on the winding roller 5 to be discharged to a front side or a lateral side of a traveling direction of the device main body 4.

(Plow Member 79)

Figure 9:
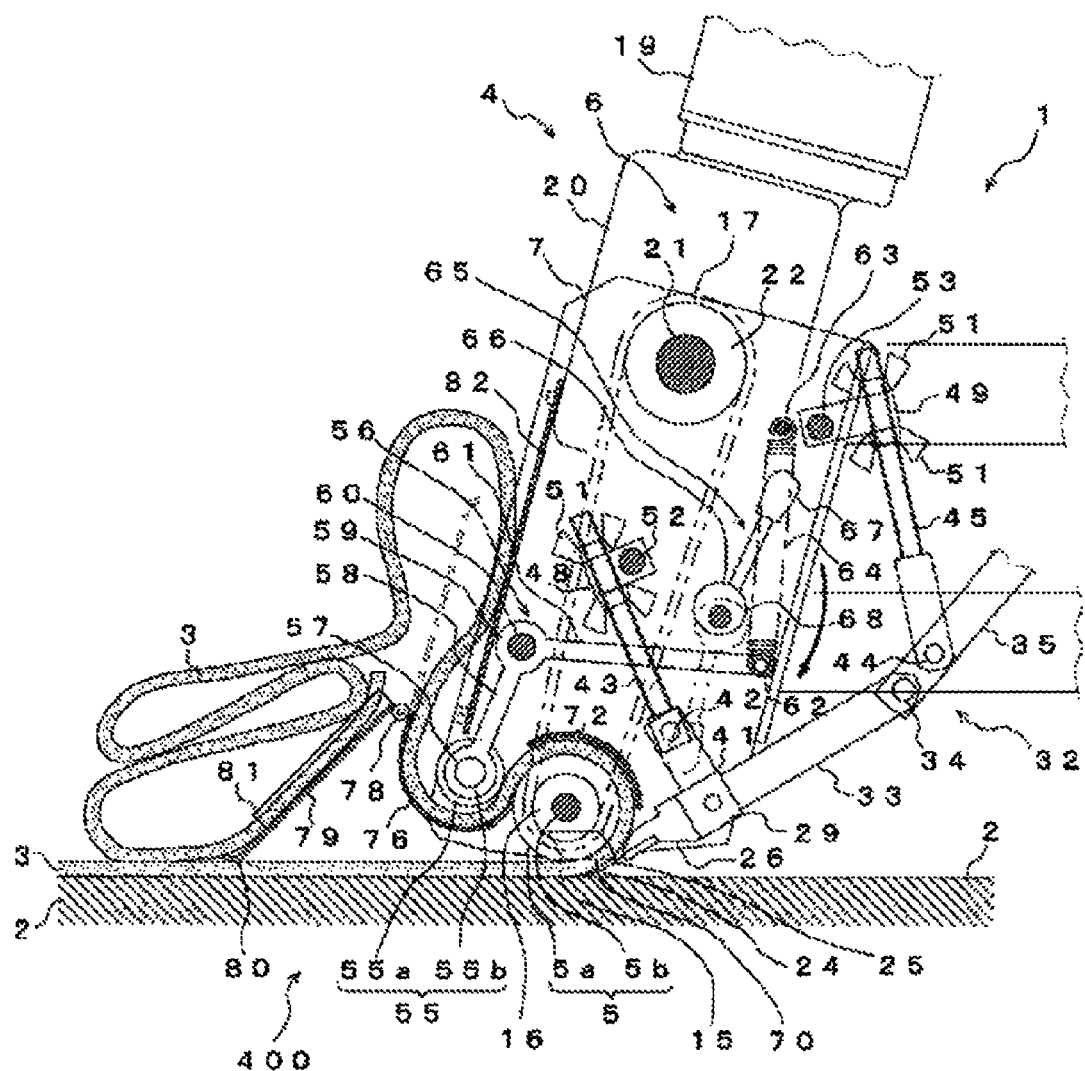
FIG. 9 is a partial transparent side view illustrating an operating state (a state in which the sheet material is folded back) of the detaching device illustrated in FIG. 6.

As illustrated in FIG. 6, a plow member (plow plate) 79 is rotatably attached to the discharge cover 76 via a hinge 78. The plow plate 79 is at a closed position during normal time (non-operation time) as shown with virtual lines in FIG. 6; and at an open position where the plow plate 79 is open to the front during operation time as shown with solid lines in FIG. 6. The plow plate 79 at the open position has a function of preventing the flooring sheet 3 from being caught in a lower side of the device main body 4 by: guiding the stripped flooring sheet 3, which is discharged to the front side of the device main body 4 and in contact with the unstripped flooring sheet 3, to an upper side and rolling into a roll as illustrated in FIG. 6 or folding as illustrated in FIG. 9; pushing the same in accordance with advancement, of the device main body 4. This can prevent the stripped flooring sheet 3 from being run over by the advancing device main body 4 and caught in the winding roller 5, and from being stepped on by a worker operating the device main body 4.

Figure 10:
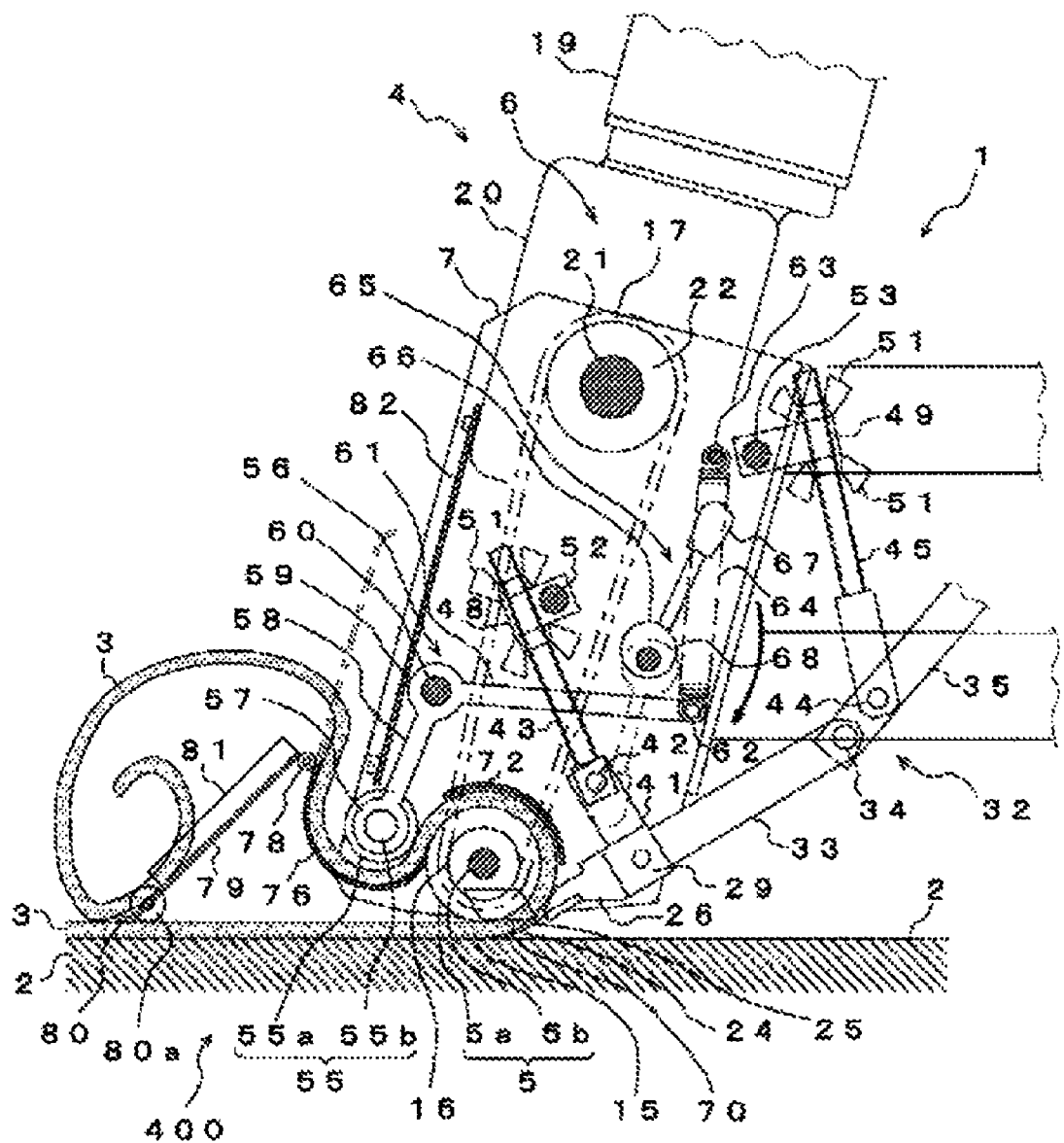
FIG. 10 is an explanatory diagram of the detaching device illustrated in FIG. 6 with an idle roller attached to the plow member.

As illustrated in FIG. 6, a leading portion of the plow plate 79 in contact with the flooring sheet. 3 is bent in a J-shape and composes a sled portion 80, preventing the device main body 4 from getting stuck with the unstripped flooring sheet 3 during advancement. In addition, both ends of the plow member 79 in the width direction are bent to have L-shaped cross sections to function as guides 81 in the width direction for the flooring sheet 3. Furthermore, as illustrated in FIG. 10, idle rollers 80a can be attached to the both ends of the plow plate 79 in the width direction. The idle rollers 80a have a function of traversing the unstripped flooring sheet 3 bonded to the floor 2 uninterruptedly and smoothly, even if the flooring sheet 3 is slightly uneven. When the sled portion 80 and the idle roller 80a traverse unevenness of the unstripped flooring sheet 3, the plow plate 79 compensates the unevenness by rotationally moving around the hinge 78.

(Protective Cover 82)

As illustrated in FIGS. 2, 3 and 6, a protective cover 82 is attached to a front face of the device main body 4 to be positioned on an upper side of the retaining roller 55 and between the left and right frame plates 7. The protective cover 82 is composed of a plate cut into a substantially inversed T-shape. An upper portion of the protective cover 82 is fixed to the gear box 20 by means of a fastening member such as a bolt, and a lower portion is fixed to the left and right frame plates 7 by means of a fastening member such as a bolt. The protective cover 82 prevents the flooring sheet 3, which is discharged to the upper side from the discharge cover 76, from entering inside the device main body 4 through a gap between the left and right frame plates 7, as illustrated in FIGS. 6 and 9. As illustrated in FIG. 9, the flooring sheet 3, which is discharged to the upper side from the discharge cover 76 and in contact with the protective cover 82, falls toward a front side of the device main body 4, is pushed by the plow plate 79 in accordance with advancement of the device main body 4, and rolled or folded.

(Supporting Portion 83)

As illustrated in FIGS. 2, 4 and 6, the device main body 4 is provided with a supporting portion 83 that is positioned on a rear side of the winding roller 5 in the traveling direction and in contact with the floor 2. The supporting portion 83 is provided for supporting the weight of the device main body 4, as well as for supporting the moment generated in the device main body 4 by the stripping reactive force. In other words, when the flooring sheet 3 is stripped from the floor 2 by the winding roller 5, a moment of making the device main body 4 fall rearward around the winding roller 5 (moment in the clockwise direction in FIG. 6) is generated as a stripping reactive force. The moment is supported by the supporting portion 83 on the floor 2. In the present embodiment, the supporting portion 83 is composed of a wheel 84. The wheel 84 is attached to the connecting pipe 11 of the device main body 4, via a height adjusting mechanism 85.

As illustrated in FIGS. 4 and 6, the height adjusting mechanism 85 includes a screw rod 86 that penetrates the connecting pipe 11 vertically, and nuts 87 that are screwed onto upper and lower portions of the screw rod 86 across the connecting pipe 11. The wheel. 84 is swingably attached to the lower portion of the screw rod 86. By adjusting the fastening position of the nut 87, a distance between the connecting pipe 11 and a lower end of the wheel 84 can be adjusted, and a distance between the floor 2 and the connecting pipe 11. An angle of the device main body 4 with respect to the floor 2 can thus be adjusted. It should be noted that the supporting member 83 can also be the wheel 84 without the height adjusting mechanism 85, or a sled that slides on the floor 2 instead of the sheet 84.

(Operation and Effect)

The sheet material detaching device 1 strips the flooring sheet 3 from the floor 2 in the following manner.

First, the operation lever 67 of the stopper mechanism 65 illustrated in FIG. 6 is moved to the lower rotated position shown with virtual lines, to make the retaining roller 55 to be in the unclamp state, spaced apart from the winding roller 5. An end portion of the flooring sheet 3 is detached from the floor 2 by a predetermined distance, by a conventional method (for example manually using a scraper). The predetermined distance is at least a distance between the point of detachment 24 of the flooring sheet 3 from the floor 2 and the retaining roller 55 in a peripheral direction of the winding roller 5 (approximately ten and several centimeters). The end portion of the flooring sheet 3 thus detached is inserted between the scraping plate 25 and the winding roller 5, and the winding roller 5 is rotated.

The flooring sheet 3 thus inserted is fed to a front side along the guiding plate 72 by the rotation of the winding roller 5, passing between the winding roller 5 and the retaining roller 55. Once the flooring sheet 3 has passed between the winding roller 5 and the retaining roller 55, the rotation of the winding roller 5 is temporarily stopped and the operation lever 67 of the stopper mechanism 65 is moved to the upper rotated position shown with solid lines, to thereby establish the clamp state in which the retaining roller 55 is pushed against the winding roller 5. As a result, the flooring sheet 3 that is wound on the winding roller 5 is sandwiched (clamped) between the winding roller 5 and the retaining roller 55.

Thereafter, by rotating the winding roller 5, the flooring sheet 3 wound on the winding roller 5 is wound by the winding roller 5 and stripped from the floor 2 as illustrated in FIGS. 6 and 7. By the stripping reactive force, the winding roller 5 is pushed against the unstripped flooring sheet 3 and rolls on the flooring sheet 3, to thereby advance the device main body 4.

As the winding roller 5 is rotated in contact with the flooring sheet 3 bonded to the floor 2, the reactive force generated upon stripping the flooring sheet 3 from the floor 2 (stripping reactive force) pushes the winding roller 5 against the flooring sheet 3. Since the stripping reactive force correlates with (positively correlates, is proportional to) an adhesive force of the flooring sheet 3 with respect to the floor 2, the greater the adhesive force, the greater the force pushing the winding roller 5 against the flooring sheet 3.

As a result, the winding roller 5 is pushed against the flooring sheet. 3 with an appropriate force in accordance with the adhesive force of the flooring sheet 3, to thereby suppress slipping of the winding roller 5 on the flooring sheet 3. Even the flooring sheet 3 having a great adhesive force with respect to the floor 2 can thus be stripped infallibly, and the device main body 4 can be advanced infallibly with a great force. In addition, the device main body 4 advances and the flooring sheet 3 is detached without a worker applying force, to thereby reduce workload. In addition, as the winding roller 5 rolls in a state of being pushed against the flooring sheet 3 bonded to the floor 2 with appropriate force in accordance with the adhesive force. As a result, the device main body 4 can be advanced in a stable manner even if the floor 2 has a slope in the vehicle width direction, or inclination and unevenness in the anteroposterior direction of the device main body 4.

In the present detaching device 1, the flooring sheet 3 is stripped by winding on the winding roller 5 pushed against the flooring sheet 3 bonded to the floor 2 and winding the flooring sheet 3 by the winding roller 5. As a result, unlike the prior art illustrated in FIG. 1 (stripping the flooring sheet (f) by winding on the roll core (d) spaced apart from the floor (e)), the flooring sheet (f) in the air between a point of detachment (g) from the floor (e) and a point of winding (h) on the roll core (d) is not stretched much. In addition, the winding force (stripping force) of the winding roller 5 can be concentrated on the point of detachment 24 of the flooring sheet 3 from the floor 2, to thereby strip the flooring sheet 3 from the floor 2 efficiently.

The present detaching device 1 strips the flooring sheet 3 from the floor 2 by rolling the winding roller 5 in close contact with the flooring sheet 3 bonded to the floor 2, and winding the flooring sheet 3 on and by the winding roller 5. Noise and residue are reduced compared to a so-called vibration type detaching device (one inserting a scraping plate between the floor 2 and the flooring sheet 3 and vibrating; refer to Patent Documents 2 and 3).

In addition, the flooring sheet 3 which is wound on the winding roller 5 and stripped from the floor 2 is discharged to a front side of the traveling direction of the device main body 4 by the guiding means 400. This can prevent the device main body 4 and a worker who is operating the device main body from stepping on the flooring sheet 3 stripped from the floor 2 as the device main body 4 advances, to thereby improve work efficiency.

In addition, as illustrated in FIGS. 6 and 9, by discharging the flooring sheet 3 to a front side of the traveling direction of the device main body 4, the discharged flooring sheet 3 can be pushed out by the plow plate 79 as the device main body 4 advances. The flooring sheet 3 stripped from the floor 2 can thus be transferred in a mass in front of the device main body 4, to thereby facilitate disposal afterward.

Figure 11:
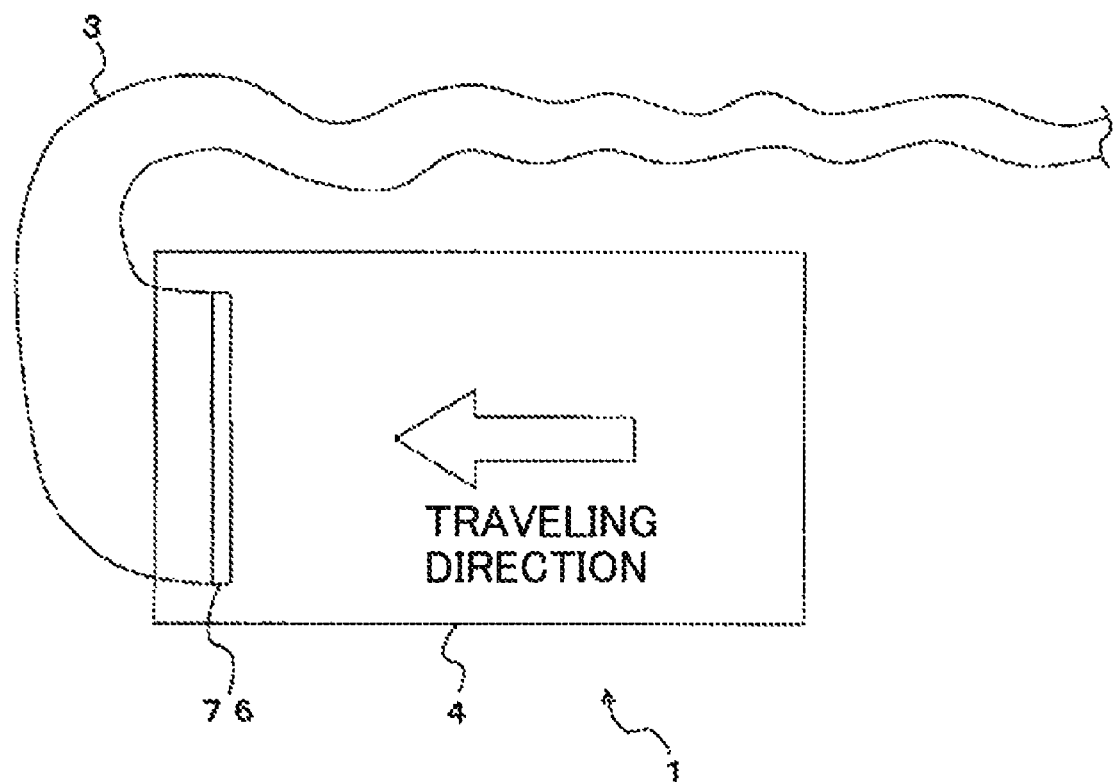
FIG. 11 is an explanatory diagram of a state in which the sheet material is discharged to a side with the detaching device illustrated in FIG. 6.

The flooring sheet 3 discharged to the upper side from the discharge cover 76 can also be configured to be discharged to a lateral side of the traveling direction of the device main body 4 by twisting above as illustrated in FIG. 11. This also can prevent the device main body 4 and a worker who is operating the device main body from stepping on the flooring sheet 3 stripped from the floor 2 as the device main body 4 advances, to thereby improve work efficiency. In addition, in this case, since the detached flooring sheet 3 is not pushed by the device main body 4, the rotative force of the winding roller 5 does not go into pushing the flooring sheet 3 and can be used intensively for detaching the flooring sheet 3.

As illustrated in FIGS. 7 and 8, the cutter 70 is provided on each lateral side of the winding roller 5 for cutting the flooring sheet 3 stripped from the floor 2. The cutter 70, which is provided in the device main body 4 which is pushed against the floor 2 by the above described stripping reactive force, is therefore pushed against the sheet material 3 wound by the winding roller 5 and stripped upward from the floor 2. The sheet material 3 can thus be appropriately cut by the cutter 70. In addition, the blade portion 70a of the cutter 70 is positioned slightly more on an upper side than a lower end of the winding roller 5. This can prevent the cutter 70 from damaging the floor 2 due to cutting of the sheet material 3 immediately after being stripped upward from the floor 2, and can prevent the blade portion of the cutter 70 from being pressed against the floor 2 and damaged. Furthermore, since the cutter 70 is arranged on each side of the winding roller 5, the sheet material 3 wound on the winding roller 5 is cut to the width of the winding roller 5 (the length of the roller main body 5a) and wound appropriately on the winding roller 5.

As illustrated in FIGS. 6 and 7, the detaching device 1 includes the scraping plate 25 that extends from a rear side of the traveling direction of the device main body 4 to a lower side of the winding roller 5, and is inserted into the point of detachment 24 between the flooring sheet. 3 and the floor 2. Since the scraping plate 25 facilitates detachment of the flooring sheet 3 from the floor 2, breakage of the flooring sheet 3 stripped from the floor 2 can be suppressed and even the flooring sheet 3 high in adhesive force can be stripped from the floor 2 effortlessly.

The scraping plate 25 is composed of a pliable material such as spring steel, and is attached to the device main body 4 such that a leading end thereof is pushed against the floor 2 when the device main body 4 is placed on the floor 2. Since the scraping plate 25 is attached to the device main body 4, which is pushed against the floor 2 by the above described stripping reactive force during a stripping work, the leading end of the scraping plate 25 is pushed against the floor 2 by the stripping reactive force. As a result, the leading end of the scraping plate 25 can scrape off an adhesive (glue), which bonds the flooring sheet 3 to the floor 2, from the floor 2. In addition, as the leading end of the scraping plate 25 bends in accordance with irregularities (unevenness) of the floor 2, the flooring sheet 3 and the adhesive can be stripped from the floor 2 appropriately.

As illustrated in FIGS. 5 and 6, the detaching device 1 is provided with the angle adjustment mechanism 32 that changes the angle and the position of the scraping plate 25 with respect to the floor 2. By changing at least one of the angle and the position of the scraping plate 25 in accordance with various conditions such as adhesive strength of the flooring sheet 3 with respect to the floor 2, stiffness of the flooring sheet 3, hardness of the adhesive, temperature, humidity, etc., by way of the angle adjustment mechanism 32, optimal detaching performance can be obtained. For example, in a case in which the adhesion strength of the flooring sheet 3 with respect to the floor 2 is high, the leading end of the scraping plate 25 can be pushed strongly against the floor 2 and inserted easily between the floor 2 and the adhesive, by increasing the angle of the scraping plate 25 with respect to the floor 2. In a case in which the adhesion strength is low, the resistance of the scraping plate 25 is reduced by reducing the angle of the scraping plate 25. In addition, the pressing force of the leading end of the scraping plate 25 with respect to the floor 2 can be adjusted by changing the position of the scraping plate 25.

As illustrated in FIGS. 6 and 7, the detaching device 1 is provided with the retaining roller 55 for sandwiching the flooring sheet 3, which is wound on the winding roller 5, with the winding roller 5. By sandwiching the flooring sheet 3, which is wound on the winding roller 5, between the retaining roller 55 and the winding roller 5, the flooring sheet 3 can be wound on the winding roller infallibly, without slipping. Loss of a force for winding the flooring sheet. 3 from the floor 2, due to slipping, can thus be suppressed. In addition, the retaining roller 55 is resiliently pushed against the winding roller 5 by the pushing means 56. This allows various flooring sheets 3 of different thicknesses (FIG. 6 illustrates a thick flooring sheet 3 and FIG. 7 illustrates a thin flooring sheet 3) to be wound on the winding roller 5 without slipping, thereby realizing flexible compatibility. The retaining roller 55 is rotated (driven) by the flooring sheet 3, which is fed in accordance with rotation of the winding roller 5.

As illustrated in FIGS. 2, 4 and 6, the device main body 1 is provided with the wheel 84 as the supporting portion 83 that is positioned on a rear side of the winding roller 5 in the traveling direction and in contact with the floor 2. As illustrated in FIG. 6, by winding and stripping the flooring sheet 3 from the floor 2 by the winding roller 5, the moment of making the device main body 4 fall rearward around the winding roller 5 (moment in the clockwise direction in FIG. 6) is generated due to counteraction. Since the moment is supported by the wheel 84 on the floor 2, the device main body 4 can stay upright in a stable manner. In addition, by employing the wheel 84 instead of a sled as the supporting portion 83, the friction resistance with the floor 2 can be reduced compared to the sled.

The height adjusting mechanism 85 is provided in the wheel 84. By changing the height of the wheel. 84 (the height from the floor 2 and the connecting pipe 11) by the height adjusting mechanism 85, the angle of the device main body 4 with respect to the floor 2 can be changed. The angle of the device main body 4 is changed in accordance with conditions such as adhesion strength of the flooring sheet 3 with respect to the floor 2. For example, in a case of a high adhesive force, the angle of the device main body 4 is increased; and, in a case of a low adhesive force, the angle is reduced. This allows easy and fine adjustment of the angle of the scraping plate 25, not by the angle adjustment mechanism 32. In addition, by changing the angle of the device main body 4, an angle of introduction of the flooring sheet 3 to the cutter 70 is also changed.

(First Modified Embodiment)

Figure 13:
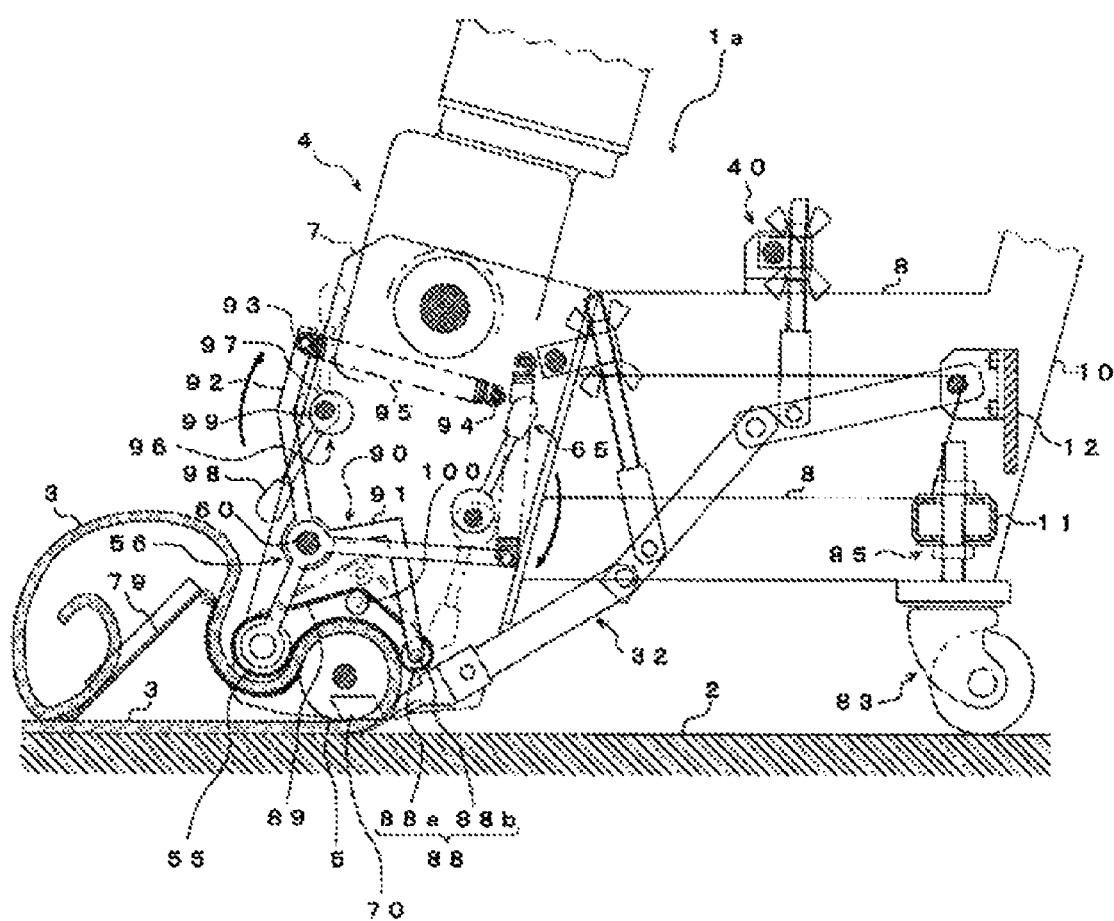
FIG. 13 is a transparent side view of a detaching device of a sheet material, illustrating a first modified embodiment of the present invention.
Figure 14:
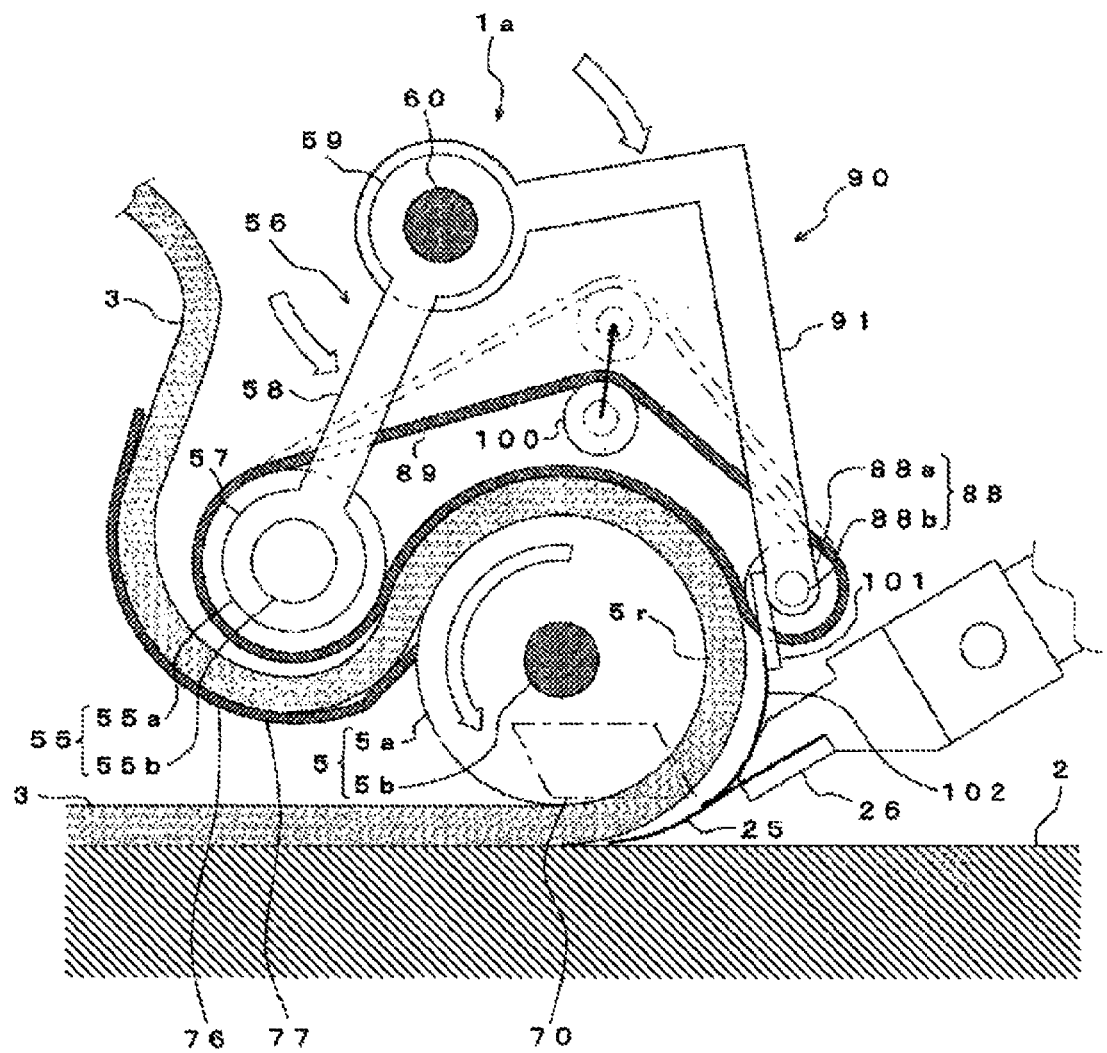
FIG. 14 is an enlarged view of a major part of the detaching device illustrated in FIG. 13.

A first modified embodiment of the present invention is illustrated in FIGS. 13 and 14. A sheet material detaching device 1a according to the present modified embodiment has a similar basic configuration to the sheet material detaching device 1 according to the above described embodiment;

however is different from the above embodiment in that: the guiding means 400a has a plurality of (two) retaining rollers 55, 88 as well as an endless belt 89 stretched around the retaining rollers 55, 88; the flooring sheet 3 is sandwiched between the endless belt 89 and the winding roller 5; and the flooring sheet 3 is pushed against the winding roller 5 via the endless belt 89. Therefore, constitutive features that are similar to those of the above embodiment are referred to with the same reference numerals, and differences are described hereafter.

As illustrated in FIGS. 13 and 14, the detaching device 1a is provided with a second retaining roller (sub retaining roller) 88 in addition to the retaining roller 55 which is similar to that of the above embodiment. The sub retaining roller 88 includes: a cylindrical roller main body 88a that is the same in length (width) as the winding roller 5, and a shaft 88b that is provided to protrude from the center of end faces of the roller main body 88a. The sub retaining roller 88 is arranged more to a rear side than the center of the winding roller 5, and pushed against the winding roller 5 by the pushing means 90.

The pushing means 90 includes: an L-shaped first arm 91 into which the shaft 88b of the sub retaining roller 88 is inserted to a lower end; a supporting pin 60 that is inserted into an end portion of the first, arm 91 and fixed onto the frame plate 7; a second arm 92 that is connected to the first arm 91; a pin 93 that is provided at an end portion of the second arm 92; and an extension spring (coil spring) 95 that is locked by the pin 93 and a pin 94 which is fixed to the frame plate 7. With the pushing means 90, by a tensile strength of the extension spring 95, the second arm 92 is rotationally moved in a clockwise direction about the supporting pin 60; the first arm 91 is rotationally moved in a clockwise direction about the supporting pin 60; and the sub retaining roller 88 is pushed against the winding roller 5.

As illustrated in FIG. 13, a stopper mechanism 96 for retaining the sub retaining roller 88 to be spaced apart from the winding roller 5 is provided on the frame plate 7. The stopper mechanism 96 is provided with: an eccentric cam 97 that is disposed on the inner side face of the frame plate 7 on a lateral side of the second arm 92; and an operation lever 98 that is fixed to the eccentric cam 97. The eccentric cam 97 includes a disk and a supporting shaft 99 that is provided eccentrically from the center of the disk. The supporting shaft 99 is rotatably supported on a hole provided on the frame plate 7. By moving the operation lever 98 to a lower rotated position as shown with solid lines in FIG. 13, the eccentric cam 97 is spaced apart from the second arm 92. As a result, the second arm 92 is allowed to rotate in the clockwise direction by the tensile force of the extension spring 95, to thereby push the sub retaining roller 88 against the winding roller 5. By rotating the operation lever 98 in the clockwise direction to an upper rotated position as shown with virtual lines in FIG. 13, the eccentric cam 97 is in contact with the second arm 92 to restrict the rotation of the second arm 92 in the clockwise direction. The sub retaining roller 88 is thus maintained to be spaced apart from the winding roller 5.

As illustrated in FIG. 14, the endless belt 89 is stretched around the sub retaining roller 88 and the retaining roller 5 to connect these. The endless belt 89 has a width corresponding to the length (width) of the roller main body 5a of the winding roller 5, and sandwiches the flooring sheet 3 with the winding roller 5. As a material for the endless belt 89, rubber, resin, textile, and combinations thereof are employed. A tension roller 100 is arranged inside the endless belt 89. The tension roller 100 is biased by a spring (not illustrated) toward an outer side (upper side) of the endless belt 89, to thereby prevent loosening of the endless belt 89. It should be noted that, mis-alignment of the endless belt 89 in a width direction can be prevented by: forming concavities on an inner peripheral surface of the endless belt 89 along a peripheral direction; forming convexities on outer peripheral surfaces of the retaining roller 55, the sub retaining roller 88, and the tension roller 100; and engaging the concavities with the convexities.

As illustrated in FIG. 14, a preceding guide 102 is attached, via a guiding plate 101, to a lower end of the first arm 91 which rotatably retains the retaining roller 88. The preceding guide 102 is configured similarly to the preceding guide 74 of FIG. 7, and composed of a thin plate (for example, appropriately 0.3 mm in thickness) of a flexible material such as spring steel, having a similar width to the winding roller 5. An upper end of the preceding guide 102 is fixed to an inner peripheral surface of the guiding plate 101, and a lower end is pushed against the scraping plate 25, thereby bending the preceding guide 102. The preceding guide 102 has similar functions to those of the preceding guide 74 of FIG. 7: a function of guiding the flooring sheet 3, which is stripped from the floor 2 and riding on the scraping plate 25, to the endless belt 89; a function of, when the angle of the scraping plate 25 with respect to the floor 2 is changed, flexibly changing a degree of curvature of the preceding guide 102 accordingly, thereby guiding smoothly and appropriately the flooring sheet 3 stripped from the floor 2 and riding on the scraping plate 25 to the endless belt 89; and a function of pushing the scraping plate 25 against the floor 2. It should be noted that the preceding guide 74 can also be pushed against the retaining member 26, in addition to the scraping plate 25.

As illustrated in FIG. 14, in the sheet material detaching device 1a according to the present modified embodiment, the endless belt 89 which is pushed against the winding roller 5 rotates (circulates) as the winding roller 5 is rotationally driven in a state in which the retaining roller 55 and the sub retaining roller 88 are pushed against the winding roller 5. As a result, once the end portion of the flooring sheet 3 which is stripped from the floor 2 is guided by the scraping plate 25, the preceding guide 102, and the guiding plate 101 to a position of the sub retaining roller 88, the flooring sheet 3 is proactively fed forward in a state of being sandwiched between the endless belt 89 and the winding roller 5, and is discharged from the discharge cover 76. In other words, the endless belt 89 has also a function of proactively guiding the flooring sheet 3 along the peripheral direction of the winding roller 5, in addition to the function of pushing the flooring sheet 3 against the winding roller 5 for avoiding slipping. Other basic operation and effect of the sheet material detaching device 1a according to the present modified embodiment are similar to those of the above embodiment.

(Second Modified Embodiment)

Figure 15:
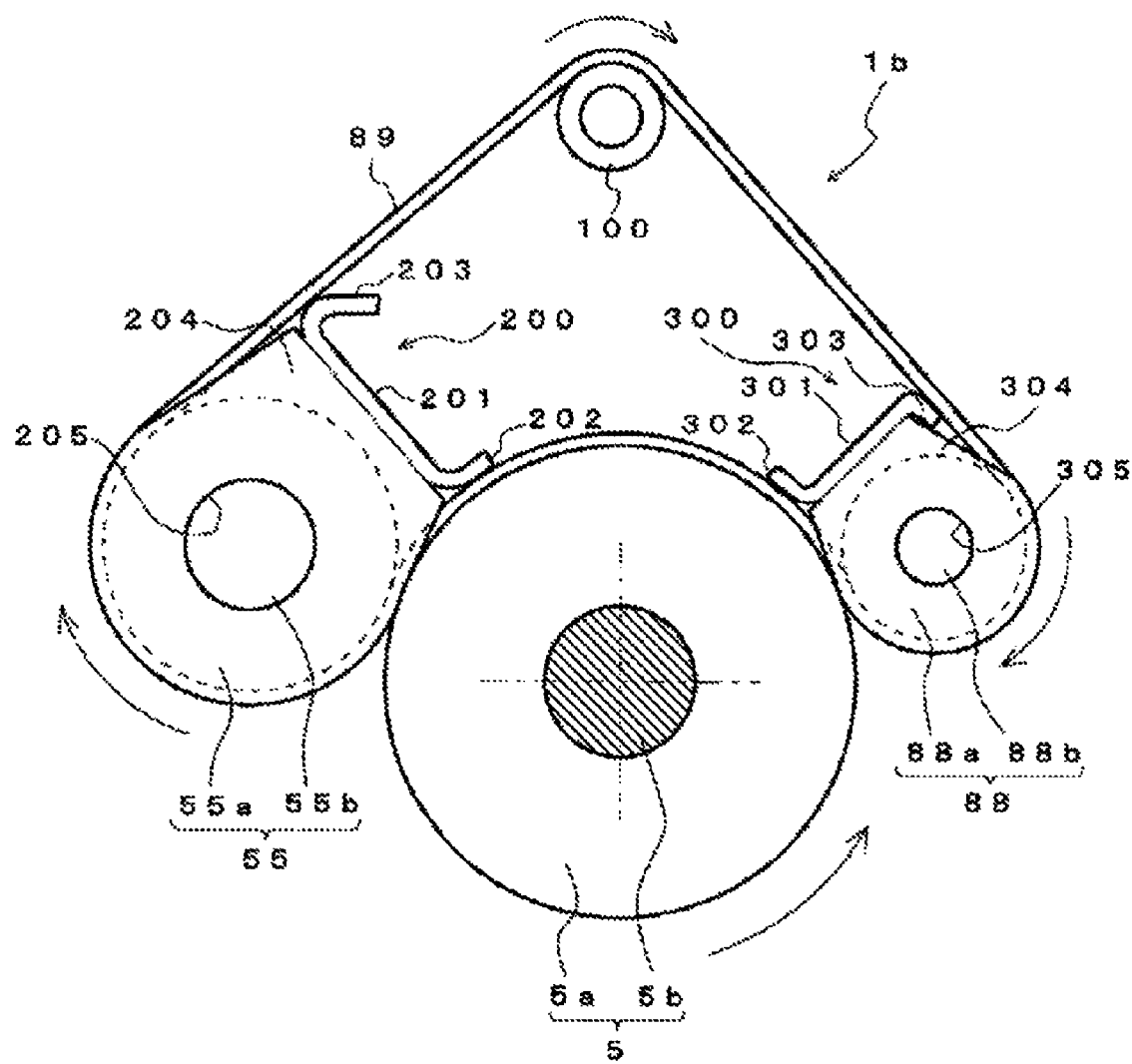
FIG. 15 is a side view of a major part of a detaching device of a sheet material, illustrating a second modified embodiment of the present invention.
Figure 16A:
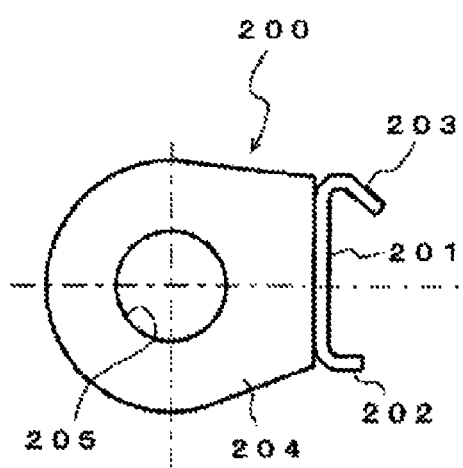
FIG. 16A is a side view.
Figure 16B:
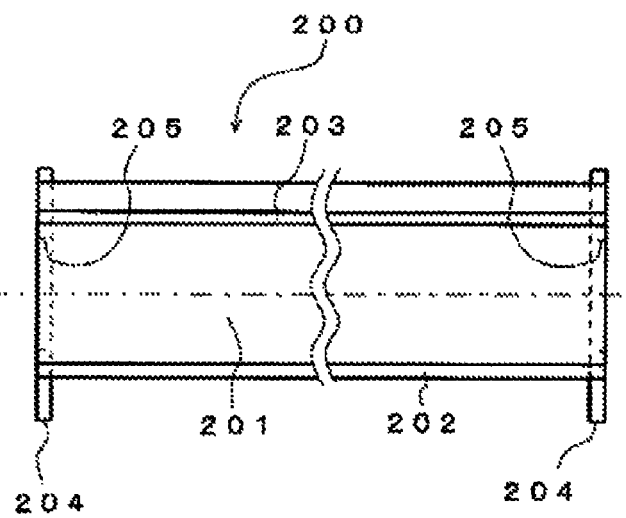
FIG. 16B is a front view.
Figure 16C:
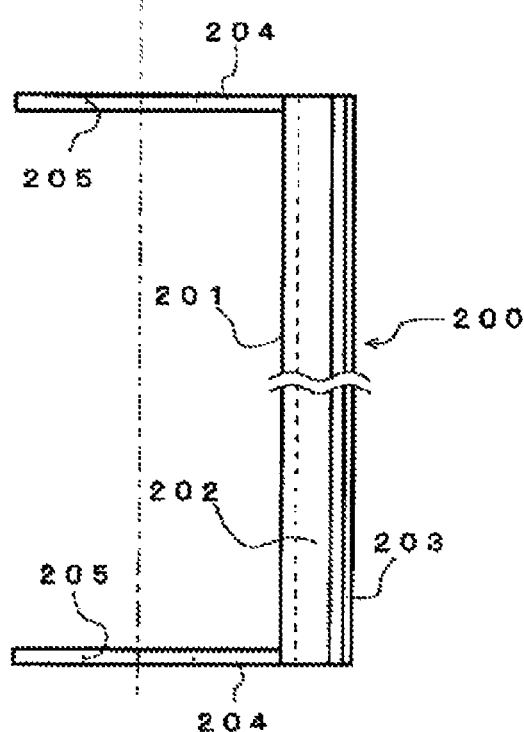
FIG. 16C is a plan view of a left protection of the detaching device illustrated in FIG. 15.
Figure 17B:
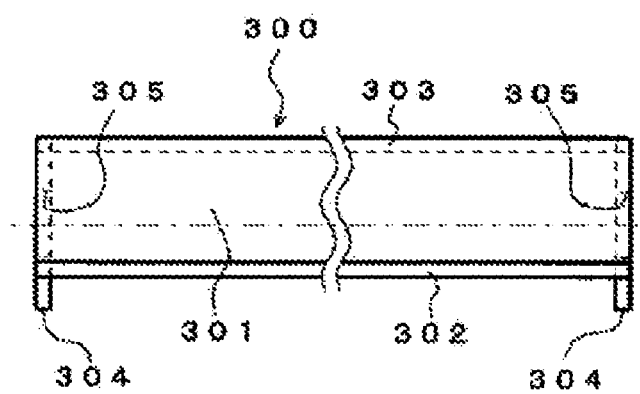
FIG. 17B is a front view.
Figure 17A:
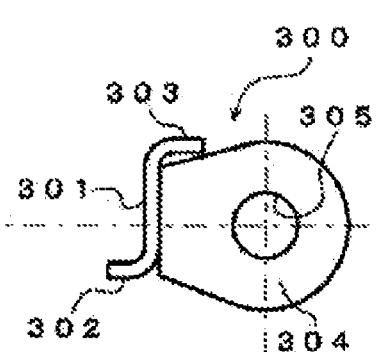
FIG. 17A is a side view.
Figure 17C:
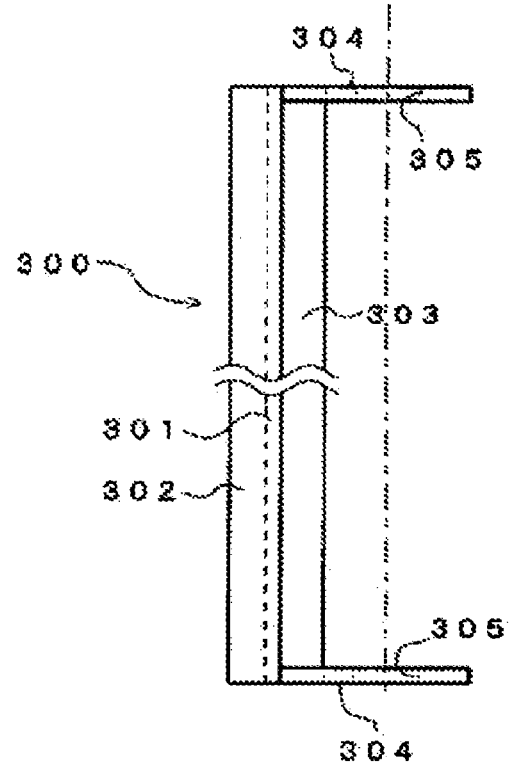
FIG. 17C is a plan view of a right protection of the detaching device illustrated in FIG. 15.

A second modified embodiment of the present invention is illustrated in FIGS. 15 to 17C. FIG. 15 is a side view of a major part of a detaching device of a sheet material, illustrating a second modified embodiment; FIGS. 16A to 16C are explanatory diagrams of a left protection of the detaching device illustrated in FIG. 15; and FIGS. 17A to 17C are explanatory diagrams of a right protection of the detaching device illustrated in FIG. 15. A sheet material detaching device 1b according to the second modified embodiment has a similar basic configuration to the sheet material detaching device 1a according to the first modified embodiment described with reference to FIGS. 13 and 14; however is different from the above embodiment in that:

protections 200, 300 are provided inside the endless belt 89 for preventing residue (waste of fiber, etc. which constitute the sheet material 3) generated during stripping of the sheet material. 3 from the base (floor 2) from being caught between the inner peripheral surface of the endless belt 89 and outer peripheral surfaces of the retaining rollers 55, 88. Therefore, constitutive features that are similar to those of above described embodiment are referred to with the same reference numerals, and differences are described hereafter.

As illustrated in FIG. 15, the sheet material detaching device 1b is provided with: a protection 200 for preventing residue from being caught between the first retaining roller 55 and the endless belt 89; and a protection 300 for preventing residue from being caught between the second retaining roller 88 and the endless belt 89.

As illustrated in FIGS. 16A to 16C, the protection 200 includes: a cover 201 that covers the roller main body 55a along the longitudinal direction of the retaining roller 55; contact portions 202, 203 that are provided on an upper edge and a lower edge of the cover 201 and in contact with the inner peripheral surface of the endless belt 89; and a supporting portion 204 that is provided on a left edge and a right edge of the cover 201 and supported by the shaft 55b of the retaining roller 55.

As illustrated in FIGS. 16B and 16C, the cover 201 is composed of a plate body formed in a rectangular shape so as to cover the upper roller main body 55a between an ascending belt and a descending belt of the endless belt 89. The cover 201 prevents residue having entered inside the endless belt 89 from being carried toward the roller main body 55a through between the ascending belt and the descending belt.

As illustrated in FIGS. 16B and 16C, the contact portion 202 is formed on the lower edge of the cover 201 along the longitudinal direction, while being formed to, when the protection 200 is attached to the shaft 55b, extend from the lower edge of the cover 201 toward the inside of the endless belt 89 along a (substantial) tangential direction of the winding roller 5 as illustrated in FIG. 15. The contact portion 202 functions as a seal for preventing residue having entered inside the endless belt 89 from being carried toward the roller main body 55a through between the endless belt 89 and the cover 201 in accordance with circulation of the endless belt 89.

As illustrated in FIGS. 1.6B and 16C, the contact portion 203 is formed on the upper edge of the cover 201 along the longitudinal direction, while being formed to have a J-shaped cross section in a side view so as to, when the protection 200 is attached to the shaft 55b, be in friction contact with the inner peripheral surface of the endless belt 89 as illustrated in FIG. 15. The contact portion 203, in friction contact with the inner peripheral surface of the endless belt 89, pushes the contact portion 202 on the lower side against the endless belt 89, to thereby improve a sealing effect.

As illustrated in FIGS. 16B and 16C, the supporting portion 204 is composed of a plate body that extends from the left edge and the right edge of the cover 201 along an end face of the roller main body 55a of the retaining roller 55. A hole 205 into which the shaft 55b of the retaining roller 55 is rotatably inserted is formed on the supporting portion 204. With the shaft 55b of the retaining roller 55 being inserted into the hole 205, the protection 200 is rotatably supported by the shaft 55b. The supporting portion 204 also functions as a cover for covering a side face of the roller main body 55a of the retaining roller 55.

On the other hand, as illustrated in FIG. 15, the protection 300, which is configured substantially similarly to the above described protection 200, is supported by the shaft 88b of the retaining roller 88. As illustrated in FIGS. 17A to 17C, the protection 300 includes: a cover 301 that covers the roller main body 88a along the longitudinal direction of the retaining roller 89; contact portions 302, 303 that are provided on an upper edge and a lower edge of the cover 301 and in contact with the inner peripheral surface of the endless belt 89; and a supporting portion 304 that is provided on a left edge and a right edge of the cover 301 and supported by the shaft 88b of the retaining roller 88.

Configurations and functions of the cover 301, the contact portions 302, 303, and the supporting portion 304 are substantially the same as configurations and functions of the cover 201, the contact portions 202, 203, and the supporting portion 204 described above, and therefore description thereof is omitted. It should be noted that there is a difference in that the contact portion 303 extends in a direction (toward an outer side of the endless belt 89) opposite to that of the contact portion 203, in consideration of a circulation direction of the endless belt 89.

As illustrated in FIG. 15, the sheet material detaching device 1b according to the present modified embodiment, provided with the protection 200 attached to the shaft 55b of the retaining roller 55 and the protection 300 attached to the shaft 88b of the retaining roller 88, can prevent residue (waste of fiber, etc. which constitute the sheet material 3) generated during stripping of the sheet material 3 from the floor 2 from being carried toward the retaining rollers 55, 88 even if the residue has entered inside the endless belt 89. A situation in which the residue is caught between the endless belt 89 and the retaining rollers 55, 88 can thus be suppressed. As a result, failures (mis-alignment and disengagement of the endless belt 89) due to the residue caught between the endless belt 89 and the retaining rollers 55, 88 can be suppressed, and work efficiency is improved.

Alternatively, in the second modified embodiment illustrated in FIGS. 15 to 17C, a thin plate composed of spring steel can be attached to the upper edge of the cover 201 of the protection 200 instead of the contact portion 203, and a thin plate composed of spring steel can be attached to the lower edge of the cover 201 instead of the contact portion 202, such that leading edges of these spring steel are pushed against the inner peripheral surface of the endless belt 89. As the leading edge of the thin plate (spring steel) attached to the lower edge of the cover 201 is pushed against the inner peripheral surface of the endless belt 89, the thin plate is bent in accordance with a thickness of the flooring sheet 3 sandwiched between the endless belt 89 and the winding roller 5, to thereby improve sealing properties.

Preferred embodiments of the present invention have been described heretofore with reference to the attached drawings; however, the present invention is not limited to the above described embodiments. The present invention also encompasses various modifications and alterations within the scope of recitations in the Claims.

For example, at least any one of the cutter 70, the scraping plate 25, the retaining rollers 55, 88, the supporting portion 83, the endless belt 89, and the protections 200, 300 can be omitted. More specifically, the cutter 70 can be omitted by making incisions in advance on the flooring sheet 3 bonded to the floor 2, corresponding to the width of the winding roller 5. The scraping plate 25 can be omitted in a case in which the flooring sheet 3 is low in adhesive force. The retaining rollers 55, 88 would be omitted if slipping can be suppressed by providing an anti-slip portion or an anti-slip layer on the surface of the winding roller 5. Alternatively, a plurality of scraping plates 25 can be provided at intervals in an anteroposterior direction. In the first modified embodiment illustrated in FIGS. 13 and 14, the endless belt 89 can be omitted and the two retaining rollers 55, 88 can be configured to be pushed directly against the flooring sheet 3 wound on the winding roller 5.

Furthermore, a device that strips the flooring sheet 3 as the sheet material from the floor 2 as the base has been described in the above described embodiment; however, the present invention is not limited thereto. The present invention can also be applied to: a detaching device that strips the sheet material bonded to a tread of stair as the base; a detaching device that strips the sheet material bonded to a riser of stair as the base; a detaching device that strips the sheet material bonded to a wall as the base; and a detaching device that strips the sheet material bonded to a ceiling as the base.

INDUSTRIAL APPLICABILITY

The present invention can be applied to a sheet material detaching device and a detaching method for stripping a sheet material (a flooring sheet or the like) that is bonded to a base (a floor or the like).

EXPLANATION OF REFERENCE NUMERALS

1 Sheet Material Detaching Device
1*a* Sheet Material Detaching Device
2 Floor as Base
3 Flooring Sheet as Sheet Material
4 Device Main Body
5 Winding Roller
5*r* Rear End
6 Driving Means
15 Point of Contact
24 Point of Detachment
25 Scraping Plate
55 Retaining Roller
56 Pushing Means
70 Cutter
70*a* Blade Portion
72 Guiding Plate
74 Preceding Guide
76 Discharge Cover
79 Plow Member (Plow Plate)
82 Protective Cover
88 Sub Retaining Roller
89 Endless Belt
90 Pushing Means
200 Protection
201 Cover
202 Contact Portion
203 Contact Portion
204 Supporting Portion
400 Guiding Means

The invention claimed is:

1. A sheet material detaching device for stripping off a sheet material bonded to a base, the device comprising:
   a device main body;
   a winding roller that is provided on the device main body so as to be in contact with the sheet material and on which is wound the sheet material that is stripped from the base from a point of contact with the sheet material;
   a driving means that, by rotationally driving the winding roller, strips the sheet material from the base, and advances the device main body in a traveling direction by pushing the winding roller against the base by a stripping reactive force and rolling the winding roller on the sheet material;
   a cutter that is provided on the device main body and positioned on each lateral side of the winding roller for cutting the sheet material stripped from the base; and
   a scraping plate that extends from a rear side of the traveling direction of the device main body to a lower side of the winding roller is attached to the device main body, the scraping plate being inserted into a point of detachment between the sheet member, which is stripped from the base, and the base, to thereby facilitate detachment of the sheet material being wound up from the base by the winding roller, wherein
   the scraping plate is attached to the device main body such that, when the sheet member bonded to the base is in contact with the winding roller, a leading end of the scraping plate is flexibly pushed against the base.

2. The sheet material detaching device according to claim 1, wherein the cutter comprises a blade portion formed in a lower portion thereof, the blade portion being attached to the device main body and positioned more on an upper side than a lower end of the winding roller, so as to penetrate the sheet member wound from the base by the winding roller.

3. The sheet material detaching device according to claim 2, further comprising a guiding means that includes one or a plurality of retaining rollers which retain the sheet material which is stripped from the base and wound on the winding roller by pushing against the winding roller and preventing slipping, and
   wherein at least one of the retaining rollers is arranged more on a front side than a center of the winding roller in the traveling direction of the device main body.

4. The sheet material detaching device according to claim 3, comprising a pushing means for pushing the retaining roller against the winding roller.

5. The sheet material detaching device according to claim 1, further comprising a guiding means that includes one or a plurality of retaining rollers which retain the sheet material which is stripped from the base and wound on the winding roller by pushing against the winding roller and preventing slipping, and
   wherein at least one of the retaining rollers is arranged more on a front side than a center of the winding roller in the traveling direction of the device main body.

6. The sheet material detaching device according to claim 5, comprising a pushing means for pushing the retaining roller against the winding roller.

7. The sheet material detaching device according to claim 1, wherein
   the scraping plate is attached to the device main body such that an angle with respect to the base, and a position of the leading end of the scraping plate in an anteroposterior direction and a vertical direction with respect to the base are adjustable.

8. The sheet material detaching device according to claim 7, comprising a preceding guide that guides the sheet member, which is stripped from the base and rides on the scraping plate, toward the winding roller, wherein
   a lower end of the preceding guide is pushed against the scraping plate, and, when the angle of the scraping plate with respect to the base is changed, a degree of curvature of the preceding guide changes flexibly in accordance with the angle of the scraping plate.

9. A sheet material detaching device for stripping off a sheet material bonded to a base, the device comprising:
   a device main body;
   a winding roller that is provided on the device main body so as to be in contact with the sheet material and on which is wound the sheet material that is stripped from the base from a point of contact with the sheet material;
a driving means that, by rotationally driving the winding roller, strips the sheet material from the base, and advances the device main body in a traveling direction by pushing the winding roller against the base by a stripping reactive force and rolling the winding roller on the sheet material;
a scraping plate that extends from a rear side of the traveling direction of the device main body to a lower side of the winding roller, the scraping plate being inserted into a point of detachment between the sheet member, which is stripped from the base, and the base; and
a preceding guide that guides the sheet member, which is stripped from the base and rides on the scraping plate, toward the winding roller,
wherein: the scraping plate is attached to the device main body such that, when the sheet member bonded to the base is in contact with the winding roller, a leading end of the scraping plate is flexibly pushed against the base and such that an angle with respect to the base, and a position of the leading end of the scraping plate in an anteroposterior direction and a vertical direction with respect to the base are adjustable; and
a lower end of the preceding guide is pushed against the scraping plate, and, when the angle of the scraping plate with respect to the base is changed, a degree of curvature of the preceding guide changes in accordance with the change of the angle of the scraping plate, thereby guiding the sheet material riding on the scraping plate.

10. The sheet material detaching device according to claim 9, wherein the device main body is provided with a discharge cover for discharging the sheet material, which is wound from the base by the winding roller, toward a front and upper side in the traveling direction of the device main body.

11. A sheet material detaching device for stripping off a sheet material bonded to a base, the device comprising:
a device main body;
a winding roller that is provided on the device main body so as to be in contact with the sheet material and on which is wound the sheet material that is stripped from the base from a point of contact with the sheet material;
a driving means that, by rotationally driving the winding roller, strips the sheet material from the base, and advances the device main body in a traveling direction by pushing the winding roller against the base by a stripping reactive force and rolling the winding roller on the sheet material;
a scraping plate that extends from a rear side of the traveling direction of the device main body to a lower side of the winding roller is attached to the device main body, the scraping plate being inserted into a point of detachment between the sheet member, which is stripped from the base, and the base, to thereby facilitate detachment of the sheet material being wound up from the base by the winding roller, wherein the scraping plate is attached to the device main body such that, when the sheet member bonded to the base is in contact with the winding roller, a leading end of the scraping plate is flexibly pushed against the base;
a guiding means that, as the main body advances, guides the sheet material stripped from the base by winding on the winding roller; wherein
the guiding means comprises:
a plurality of retaining rollers which retain the sheet material which is stripped from the base and wound on the winding roller by pushing against the winding roller and preventing slipping; and
an endless belt stretched around the retaining rollers;
wherein the sheet material is sandwiched between the endless belt and the winding roller, and pushed against the winding roller via the endless belt.

12. The sheet material detaching device according to claim 11, comprising a protection inside the endless belt for preventing residue, which is generated during stripping of the sheet material from the base, from being caught between the endless belt and the retaining roller,
the protection comprises: a cover that covers the retaining roller along a longitudinal direction of the retaining roller;
a contact portion that is provided on the cover and in contact with an inner periphery of the endless belt; and
a supporting portion that is provided on the cover and supported by a shaft of the retaining roller.

13. The sheet material detaching device according to claim 11, wherein the guiding means further comprises a discharge cover for discharging the sheet material, which is wound from the base by the winding roller, toward the front and an upper side in the traveling direction of the device main body.

14. The sheet material detaching device according to claim 11, wherein
the scraping plate is attached to the device main body such that an angle with respect to the base, and a position of the scraping plate in an anteroposterior direction and a vertical direction with respect to the base are adjustable.

15. The sheet material detaching device according to claim 14, wherein the guiding means further comprises a preceding guide that guides the sheet member, which is stripped from the base and rides on the scraping plate, toward the winding roller, and
wherein a lower end of the preceding guide is flexibly pushed against the scraping plate, and, when the angle of the scraping plate with respect to the base is changed, a degree of curvature of the preceding guide changes in accordance with the angle of the scraping plate.

16. A sheet material detaching device for stripping off a sheet material bonded to a base, the device comprising:
a device main body;
a winding roller that is provided on the device main body so as to be in contact with the sheet material and on which is wound the sheet material that is stripped from the base from a point of contact with the sheet material;
a driving means that, by rotationally driving the winding roller, strips the sheet material from the base, and advances the device main body in a traveling direction by pushing the winding roller against the base by a stripping reactive force and rolling the winding roller on the sheet material,
a cutter that is provided on the device main body and positioned on each lateral side of the winding roller for cutting the sheet material stripped from the base; and
a guiding means that, as the main body advances, guides the sheet material stripped from the base by winding on the winding roller;
wherein the guiding means comprises a discharge cover provided at the device main body for discharging the sheet material, which is wound from the base by the winding roller, toward a front and upper side in the traveling direction of the device main body.

17. A sheet material detaching device for stripping off a sheet material bonded to a base, the device comprising:
- a device main body;
- a winding roller that is provided on the device main body so as to be in contact with the sheet material and on which is wound the sheet material that is stripped from the base from a point of contact with the sheet material;
- a driving means that, by rotationally driving the winding roller, strips the sheet material from the base, and advances the device main body in a traveling direction by pushing the winding roller against the base by a stripping reactive force and rolling the winding roller on the sheet material;
- a scraping plate that extends from a rear side of the traveling direction of the device main body to a lower side of the winding roller, the scraping plate being inserted into a point of detachment between the sheet member, which is stripped from the base, and the base, an angle thereof with respect to the base being changeable; and
- a plurality of retaining rollers which retain the sheet material which is stripped from the base and wound on the winding roller by pushing against the winding roller and preventing slipping; and
- an endless belt stretched around the retaining rollers,
- wherein: the sheet material is sandwiched between the endless belt and the winding roller, and pushed against the winding roller via the endless belt;
- a preceding guide plate for guiding the sheet member, which is stripped from the base and rides on the scraping plate, to the endless belt is provided; and
- a lower end of the preceding guide plate is pushed against the scraping plate.

18. A detaching method of a sheet material bonded to a base, comprising:
- bringing a winding roller, provided on a device main body, into contact with the base via the sheet material that is bonded to the base;
- stripping the sheet material from the base;
- winding an end portion of the sheet material stripped from the base on the winding roller from a point of contact with the winding roller;
- winding up the sheet material by the winding roller by rotating the winding roller to strip the sheet material from the base, while pushing the winding roller against the base by a stripping reactive force and advancing by rolling the winding roller on the sheet material not stripped from the base; and
- the sheet material which is wound up by the winding roller and stripped from the base is cut by pushing against a cutter arranged on each side of the winding roller to be spaced apart from the base, immediately after being stripped from the base.

19. A detaching method of a sheet material bonded to a base, by using a sheet material detaching device,
the device comprising:
- a winding roller, provided on a device main body, that is in contact with the sheet material and on which is wound the sheet material that is stripped from the base from a point of contact with the sheet material;
- a driving means that, by rotationally driving the winding roller, strips the sheet material from the base, and advances a device main body by pushing the winding roller against the base by a stripping reactive force and rolling the winding roller on the sheet material;
- a plurality of retaining rollers arranged so as to retain the sheet material which is stripped from the base and wound on the winding roller by pushing against the winding roller and preventing slipping; and
- an endless belt stretched around the retaining rollers;
wherein the detaching method comprises:
- bringing the winding roller into contact with the base via the sheet material that is bonded to the base;
- stripping the sheet material from the base;
- winding an end portion of the sheet material stripped from the base on the winding roller from the point of contact with the winding roller; and
- sandwiching the sheet material between the endless belt and the winding roller, and pushing the sheet material against the winding roller via the endless belt.

* * * * *